(12) United States Patent
Cho et al.

(10) Patent No.: US 9,013,458 B2
(45) Date of Patent: Apr. 21, 2015

(54) DISPLAY DEVICE AND METHOD FOR CONTROLLING THE SAME

(71) Applicant: LG Electronics Inc., Seoul (KR)

(72) Inventors: Eunhyung Cho, Seoul (KR); Sinae Chun, Seoul (KR); Jihwan Kim, Seoul (KR)

(73) Assignee: LG Electronics Inc., Seoul (KR)

(*) Notice: Subject to any disclaimer, the term of this patent is extended or adjusted under 35 U.S.C. 154(b) by 104 days.

(21) Appl. No.: 13/957,199

(22) Filed: Aug. 1, 2013

(65) Prior Publication Data

US 2014/0285476 A1 Sep. 25, 2014

Related U.S. Application Data

(60) Provisional application No. 61/803,799, filed on Mar. 21, 2013.

(30) Foreign Application Priority Data

Jun. 25, 2013 (KR) ........................ 10-2013-0072965

(51) Int. Cl.
*G09G 5/00* (2006.01)
*H04M 1/02* (2006.01)
*G06F 1/16* (2006.01)

(52) U.S. Cl.
CPC ........... *H04M 1/0268* (2013.01); *G06F 1/1601* (2013.01)

(58) Field of Classification Search
CPC ........ G09G 5/00; G09G 3/001; G06F 1/1601; H04N 5/222; H04M 1/0268
See application file for complete search history.

(56) References Cited

U.S. PATENT DOCUMENTS

| | | |
|---|---|---|
| 2005/0164752 A1 | 7/2005 | Lau et al. |
| 2009/0022428 A1* | 1/2009 | Lee et al. ...................... 382/309 |
| 2009/0295976 A1* | 12/2009 | Choi ........................ 348/333.11 |
| 2010/0120470 A1* | 5/2010 | Kim et al. ..................... 455/566 |
| 2011/0273473 A1* | 11/2011 | Kim ............................. 345/629 |

FOREIGN PATENT DOCUMENTS

| | | |
|---|---|---|
| JP | 2006-287982 A | 10/2006 |
| KR | 10-2008-0035709 A | 4/2008 |
| KR | 10-2011-0133861 A | 12/2011 |
| WO | WO 01/53919 A2 | 7/2001 |

* cited by examiner

*Primary Examiner* — Andrew Sasinowski
(74) *Attorney, Agent, or Firm* — Birch, Stewart, Kolasch & Birch, LLP

(57) ABSTRACT

A display device and a method for controlling the same are disclosed. More specifically, a three-foldable display device and a method for controlling the same are disclosed, wherein the three-foldable display device has two cameras at previously set locations with different resolutions different from each other and controls a location for providing a preview interface in accordance with an activated one of the two cameras.

20 Claims, 23 Drawing Sheets

(a)

(b)

DISPLAY DEVICE AND METHOD FOR CONTROLLING THE SAME

This application claims the benefit of the U.S. Provisional Application No. 61/803,799 filed on Mar. 21, 2013 and Korean Patent Application No. 10-2013-0072965, filed on Jun. 25, 2013, which are hereby incorporated by reference as if fully set forth herein.

BACKGROUND OF THE INVENTION

1. Field of the Invention

The present specification relates to a display device and a method for controlling the same, and more particularly, to a three-foldable display device which has two cameras at previously set locations with different resolutions different from each other and controls a location for providing a preview interface in accordance with an activated one of the two cameras.

2. Discussion of the Related Art

It is general that a display device such as a smart phone includes two cameras. In this case, a first camera is provided on a rear side of the display device and a second camera is provided on a front side of the display device.

At this time, it is general that the first camera of the rear side has high resolution and the second camera of the front side has low resolution. This is because that the second camera of the front side is mainly used for a short distance photographing such as self photographing of a user.

However, when the display device is a three-foldable and two cameras are located at the same side (for example, front side or rear side) of the display device, it has not been defined where to locate the first camera and the second camera, which have their respective resolutions different from each other. Also, a screen has not been defined, where a first image acquired from the first camera or a second image acquired from the second camera should be displayed.

SUMMARY OF THE INVENTION

Accordingly, the present specification is directed to a display device and a method for controlling the same, which substantially obviate one or more problems due to limitations and disadvantages of the related art.

An object of the present specification is to provide a three-foldable display device and a method for controlling the same, in which locations of a first camera and a second camera are determined, wherein the first camera has resolution different from that of the second camera.

Another object of the present specification is to provide a three-foldable display device and a method for controlling the same, in which a location for providing a preview interface, which displays an image of acquired from an activated one of a first camera and a second camera, which have their respective resolutions different from each other.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a display device according to one embodiment comprises a first body configured to include a first screen, a second body configured to include a second screen, a third body configured to include a third screen, wherein the first screen, the second screen and the third screen are provided on a front side of the display device, a first bending portion configured to connect the first body with the second body, a second bending portion configured to connect the second body with the third body, a first camera of first resolution, which is provided in the first body, a second camera of second resolution, which is provided in the second body, wherein the first resolution of the first camera is higher than the second resolution of the second camera, and the first camera and the second camera are provided on the front side of the display device, and a processor configured to control the first camera, the second camera, the first screen, the second screen and the third screen, wherein the processor is further configured to provide a preview interface to the second screen and the third screen if the first camera is activated, wherein the preview interface displays a first image acquired from the first camera, and provide the preview interface to the first screen or the third screen if the second camera is activated, wherein the preview interface displays a second image acquired from the second camera.

In another embodiment, a method for controlling a display device, which includes a first body configured to include a first screen, a second body configured to include a second screen, a third body configured to include a third screen, a first bending portion configured to connect the first body with the second body, and a second bending portion configured to connect the second body with the third body, comprises the steps of providing a preview interface to the second screen and the third screen if a first camera of first resolution, which is provided in the first body, is activated, wherein the preview interface displays a first image acquired from the first camera, and providing the preview interface to the first screen or the third screen if a second camera of second resolution, which is provided in the second body, is activated, wherein the preview interface displays a second image acquired from the second camera, wherein the first resolution of the first camera is higher than the second resolution of the second camera, and the first camera and the second camera are provided on a front side of the display device.

In other embodiment, a display device comprises a first body configured to include a first screen, a second body configured to include a second screen, a third body configured to include a third screen, wherein the first screen, the second screen and the third screen are provided on a front side of the display device, a first bending portion configured to connect the first body with the second body, a second bending portion configured to connect the second body with the third body, a first camera of first resolution, which is provided in the first body, a second camera of second resolution, which is provided in the second body, wherein the first resolution of the first camera is higher than the second resolution of the second camera, and the first camera and the second camera are provided on the front side of the display device, and a processor configured to control the first camera, the second camera, the first screen, the second screen and the third screen, wherein if the display device is in a 2D mode, the processor activates the first camera, and if the display device is in a 3D mode, the processor activates both the first camera and the second camera, and controls the first resolution to be lowered so that the first resolution is the same as the second resolution.

According to one embodiment, the three-foldable display device may set locations of the first camera and the second camera, which have their respective resolutions different from each other, differently from each other. Accordingly, the three-foldable display device may display an image based on high resolution on a greater screen area and an image based on low resolution on a smaller screen area. In other words, the display device according to one embodiment may use a screen area suitable for resolution of the image.

According to another embodiment, the three-foldable display device may control a location that provides a preview interface in accordance with the first camera or the second camera, which is activated. Accordingly, the user may view the preview interface on his or her convenient screen.

More detailed advantageous effects will be described hereinafter.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Moreover, although the embodiments will be described in detail with reference to the accompanying drawings and the disclosure described by the drawings, it is to be understood that the present specification is not limited by such embodiments.

In the meantime, a display device disclosed in this specification may include various types of display devices, such as a personal computer (PC), a personal digital assistant (PDA), a notebook computer, a tablet PC, and a smart phone, which may display images. Also, in this specification, the display device may include a touch screen.

Figure 1:
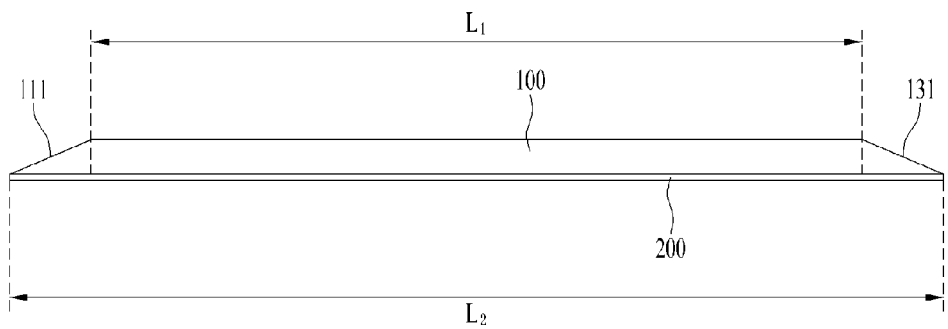
FIG. 1 is a view showing a schematic structure of a display device according to an embodiment of the present invention.

FIG. 1 is a view showing a schematic structure of a display device according to an embodiment of the present invention.

Referring to FIG. 1, the display device according to an embodiment of the present invention may comprise a body 100 and a flexible display screen 200 supported by a body.

The body 100 may comprise sloping surfaces 111 and 131. The sloping surfaces 111 and 131 may be formed at both edges of the body 100.

Accordingly, the length of the body 100 may be L1, and the length of the flexible display screen 200 may be L2 which is greater than the length L1 of the body 100.

The body 100 may comprise a first sloping body 111 and a second sloping body 131 which extend from both edges of the body 100 to both edges of the flexible display screen 200.

The body 100, the first sloping body 111, and the second sloping body 131 may comprise logically separated regions or physically separated regions in a housing.

The flexible display screen 200 may be bent together with the body 100, supported by the body 100, as the body 100 is bent in a predetermined direction.

The display device according to an embodiment of the present invention may be rotated and bent at a predetermined region of the body 100. The body 100 may be divided into a plurality of bodies, and a bending portion may be formed between each of the divided bodies. The predetermined region may correspond to the bending portion.

Figure 2:
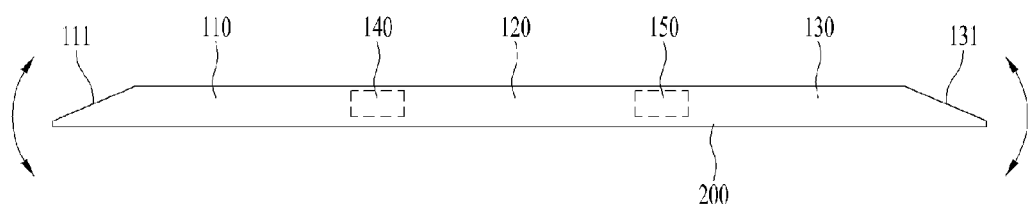
FIG. 2 is a view for explaining in more detail the display device shown in FIG. 1.

FIG. 2 is a view for explaining in more detail the display device shown in FIG. 1.

Referring to FIG. 2, in the display device according to an embodiment of the present invention, the body may comprise a first body 110, a second body 120, and a third body 130. The first body 110, the second body 120, and the third body 130 may be sequentially connected to each other.

A first bending portion 140 may be provided between the first body 110 and the second body 120, and a second bending portion 150 may be provided between the second body 129 and the third body 130.

Moreover, the flexible display screen 200 may be supported by the first body 110, the second body 120, and the third body 130 to form a continuous screen.

The first bending portion 140 and the second bending portion 150 may be made of the same material as the first to third bodies 110 to 130. As the flexible touch screen 200 is bent, the first to third bodies 110, 120, and 130 also may be made of a flexible material.

Moreover, the first bending portion 140 and the second bending portion 150 may be made of an elastic material. After the first body 110 and/or third body 130 are bent in their respective predetermined directions, if they are applied with a predetermined force, they may return to their original positions by the first bending portion 140 and the second bending portion 150.

As described above, the schematic configuration of the display device according to an embodiment of the present invention will be described with reference to FIGS. 1 and 2.

In what follows, an example of forming an integrated full body screen as the display device according to an embodiment of the present invention is bent will be described.

FIGS. 3 to 6 are views for explaining a procedure of folding the display device according to an embodiment of the present invention.

Figure 3:
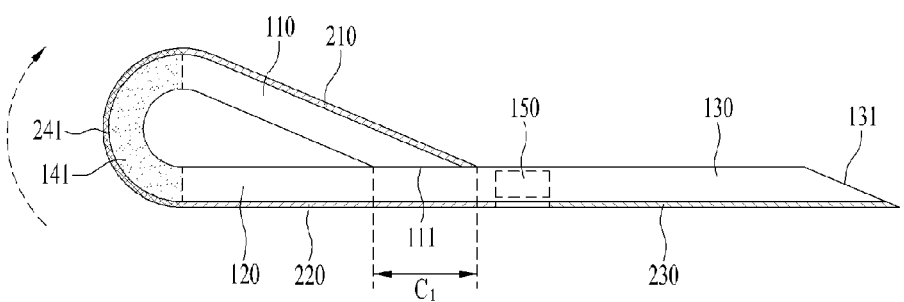
FIGS. 3 to 6 are views for explaining a procedure of folding the display device according to an embodiment of the present invention.
Figure 4:
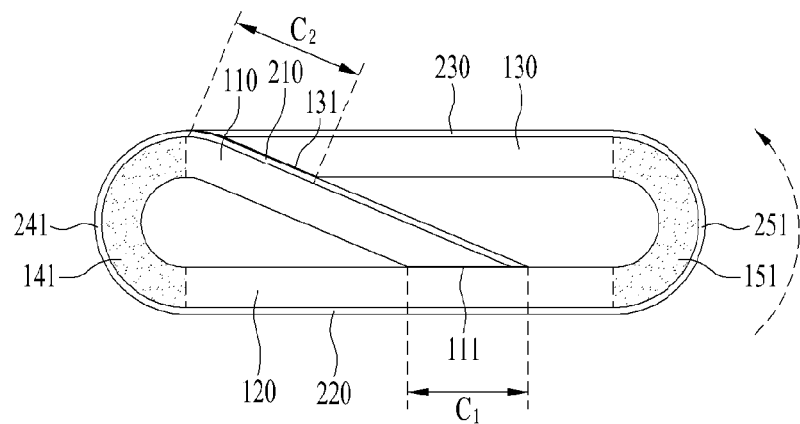

FIG. 3 shows an example in which the first body 110 is folded at the bending portion 141, and FIG. 4 shows the third body 130 being folded at the second bending portion 151 when the first body 110 is in a folded state.

Referring to FIG. 3, the flexible display screen 200 may comprise a first screen 210, a second screen 220, and a third screen 230.

The first screen 210 may be supported by the first body 110, the second screen 220 may be supported by the second body 120, and the third screen 230 may be supported by the third body 130. That is, the flexible display screen 200 is disposed on a side surface (e.g., front surface) of the body 100 to form a continuous screen.

As the first body 110 is rotated clockwise on the first bending portion 141, the sloping surface 111 formed on a cross-section of the body 110 is attached to a predetermined region C1 of the second body 120.

The sloping surface 111 of the first body 110 and the predetermined region C1 of the second body 120 may be magnetically attracted to each other. That is, the sloping surface 111 of the first body 110 and the predetermined region C1 of the second body 120 have the opposite polarity. Magnetic coupling caused by the rotation of a specific body will be described in more detail with reference to FIGS. 14 to 16.

If the angle of clockwise rotation of the first body 110 by the elastic force of the first bending portion 141 exceeds a predetermined critical angle, the elastic force of the first bending portion 141 and the magnetic attraction between the sloping surface 111 and the predetermined region C1 of the second body 120 cause the sloping surface 111 to be attached to the predetermined region C1 of the second body 120.

By the way, when the sloping surface 111 is attached to the predetermined region C1 of the second body 120, the first body 110 and the second body 120 are not attached to each other. That is, the first bending portion 141 has a predetermined elastic force but maintains a predetermined shape by the rotation of the first body 110. Accordingly, a space exists between the first body 110 and the second body 120.

The position of the predetermined region C1 of the second body 120 to which the sloping surface 111 is attached may be the position which causes the second body 120 and the third body 130 to be in parallel when the third body 130 is rotated counterclockwise and is attached to a predetermined region (C2 of FIG. 4) of the first screen 210 supported by the first body 110.

Referring to FIG. 4, after the sloping surface 111 of the first body 110 is attached to the predetermined region C1 of the second body 120, the third body 130 may be rotated counterclockwise and be coupled to the first body 110.

More specifically, the sloping surface 131 of the third body 130 may be rotated counterclockwise on the second bending portion 151, and be attached to the predetermined region C2 of the first screen 210 supported by the first body 110.

Similarly in FIG. 3, the sloping surface 131 of the third body 130 and the predetermined region C2 of the first screen 210 may be magnetically attracted to each other.

As stated above, the position of the predetermined region C2 of the first screen 210 to which the sloping surface 131 of the third body 130 is attached may be the position which causes the third body 130 to be kept in parallel with the second body 120 when the third body 130 is rotated counterclockwise on the second bending portion 151.

In FIGS. 3 to 4, the sloping surface 111 of the first body 1110 may comprise a sloping surface region of the first body and a sloping surface region of the first screen 210, and the sloping surface 131 of the third body 130 may comprise a sloping surface region of the third body 130 and a sloping surface region of the third screen 230.

Accordingly, due to the rotation of the first body 110, both the sloping surface region of the first body 110 and the sloping surface region of the first screen 210 are magnetically attracted to the predetermined region c1 of the second body. Moreover, due to the rotation of the third body 130, both the sloping surface region of the third body 130 and the sloping surface region of the third screen 230 are magnetically attracted to the predetermined region c2 of the first screen 210.

Moreover, referring to FIGS. 3 and 4, the first bending portion 141 and the second bending portion 151 may maintain a predetermined shape so that the display device according to an embodiment of the present invention is provided with a full body screen by the rotation of the first body 110 and the third body 130.

Although FIGS. 3 and 4 illustrate the procedure of forming a full body screen in such a manner that the third body 130 is folded when the first body 110 is already in a folded state, the full body screen can be formed regardless of the folding order of the first body 110 and the third body 130.

That is, owing to the symmetrical structure, the same full body screen can be formed regardless of the folding order of the first body 110 and the third body 130.

Figure 5:
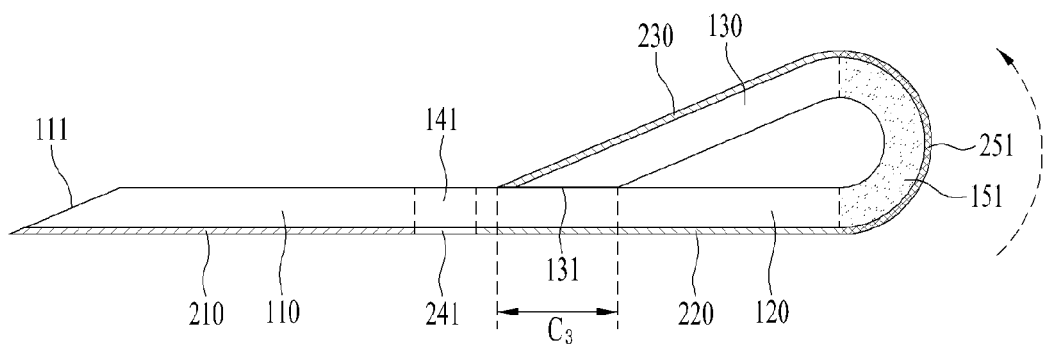

Referring to FIG. 5, as the third body 130 is rotated counterclockwise on the second bending portion 151, the sloping surface 131 formed on a cross-section of the third body 130 is attached to a predetermined region c3 of the second body 120.

The sloping surface 131 of the third body 130 and the predetermined region C3 of the second body 120 may be magnetically attracted to each other. That is, the sloping surface 111 and the predetermined region C3 of the second body 120 have the opposite polarity.

If the angle of counterclockwise rotation of the third body 130 by the elastic force of the first bending portion 141 exceeds a predetermined critical angle, the elastic force of the second bending portion 151 and the magnetic attraction between the sloping surface 131 and the predetermined region C3 of the second body 120 cause the sloping surface 131 to be attached to the predetermined region C3 of the second body 120.

By the way, when the sloping surface 131 is attached to the predetermined region C3 of the second body 120, the third body 130 and the second body 120 are not attached to each other. That is, the second bending portion 151 has a predetermined elastic force but maintains a predetermined shape by the rotation of the third body 130. Accordingly, a space exists between the third body 130 and the second body 120.

The position of the predetermined region C3 of the second body 120 to which the sloping surface 131 is attached may be the position which causes the second body 120 and the first body 110 to be in parallel when the first body 110 is rotated clockwise and is attached to a predetermined region (C4 of FIG. 6) of the third screen 310 supported by the third body 130.

Figure 6:
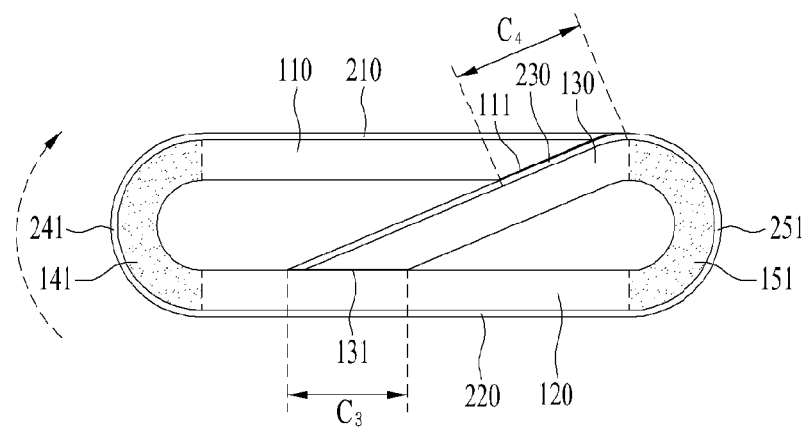

Afterwards, referring to FIG. 6, after the sloping surface 141 of the third body 130 is attached to the predetermined region C3 of the second body 120, the first body 110 may be rotated clockwise and be coupled to the third body 110.

More specifically, the sloping surface 111 of the first body 110 may be rotated clockwise on the first bending portion 141, and be attached to the predetermined region C4 of the third screen 310 supported by the third body 130.

As seen from FIGS. 3 to 6, owing to the fully symmetrical structure, the display device according to an embodiment of the present invention can be provided with the same full body screen regardless of which of the first body 110 and the third body 130 is rotated on the second body 120 first.

While the above description has been made with respect to the case in which the first body 110 and/or the third body 130 is rotated in a direction which causes the flexible display screen 200 to be exposed to the outside, the present invention is not limited to this case.

For instance, referring again to FIG. 1, the flexible display screen 200 may be disposed not on the front surface of the body 100 but on the rear surface thereof. In this case, the first body 110 and/or the third body 130 is sequentially rotated and folded, thereby causing the flexible display screen 200 to be blocked by the first body 110 and/or the third body 130.

The deformation of bending portions 140 and 150 provided at the body 100 by the rotation of the first body 110 and/or the third body 130 will be described below.

Figure 7:
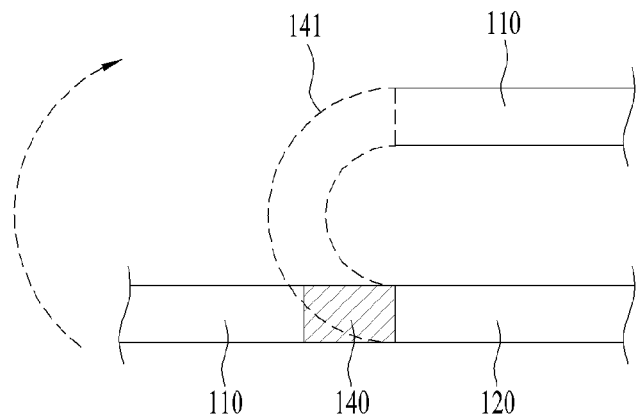
FIGS. 7 and 8 are views showing an example of shape deformation of bending portions upon rotation.
Figure 8:
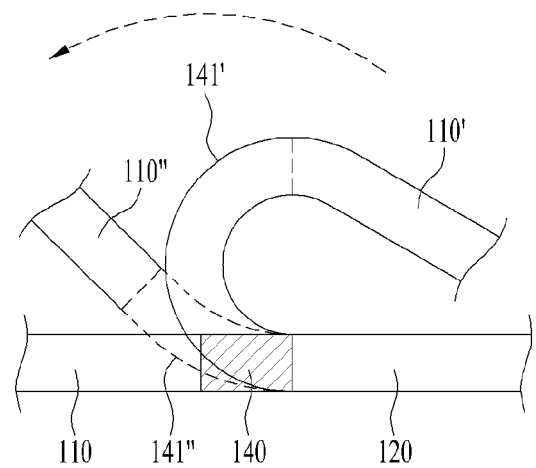

FIGS. 7 and 8 are views showing an example of shape deformation of bending portions upon rotation.

Referring to FIG. 7, the first bending portion 140 is positioned between the first body 110 and the second body 120.

As the first body 110 is rotated clockwise, the first bending portion 140 may be deformed in shape to a semicircular bending portion 141.

Referring to FIG. 8, with the first body 110 being deformed in shape to a semicircular bending portion 141' due to clockwise rotation, if the first body 110 is rotated counterclockwise, the semicircular bending portion 141' may return to the shape of the first bending portion 140 as its length is reduced. That is, the shape of the first bending portion 140 may be flexibly changed to 141' 141", and so on by the rotation of the first body 110.

Although not shown, it is needless to say that the shape of the second bending portion 150 also may be deformed by the rotation of the third body 130 as described above.

Figure 9:
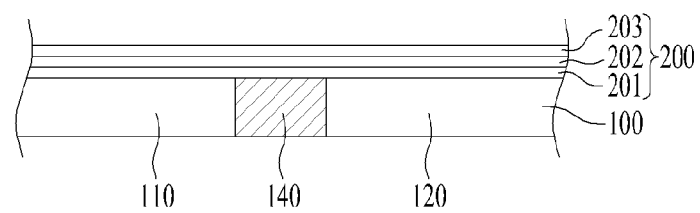
FIG. 9 is a view for explaining in detail a configuration of the display device according to an embodiment of the present invention.
Figure 10:
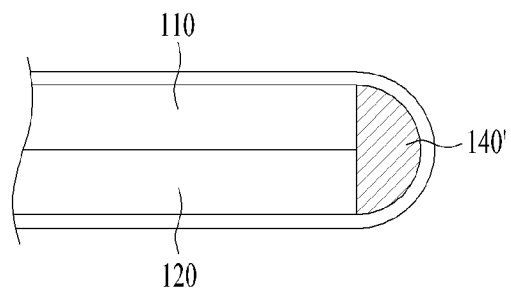
FIG. 10 is a view showing the display device shown in FIG. 9 being folded in a particular direction.

FIG. 9 is a view for explaining in detail a configuration of the display device according to an embodiment of the present invention. FIG. 10 is a view showing the display device shown in FIG. 9 being folded in a particular direction.

Referring to FIG. 9, the display device according to an embodiment of the present invention may comprise the body 100, a backlight unit layer 201 adjoining the body 100, a flexible display screen 202, and a touch layer 203.

Moreover, the body 100 may be provided with the first bending portion 140 between the first body 110 and the second body 120. Although not shown, the second bending portion 150 may be provided between the second body 120 and the third body 130, and the flexible display screen 200 may be supported by the first body 110, the first bending portion 140, the second body 120, the second bending portion 150, and the third body 130 to thus form a continuous screen.

Further, as the body 100 is bent by each of the bending portions 140 and 150, the flexible display screen 200 also may be bent.

Referring to FIG. 10, the second body 120 may be rotated clockwise on the first bending portion 140, and be coupled to the first body 110. In this case, the shape of the first bending portion 140 may be deformed from a rectangular shape to a semicircular shape, thus linking together the first body 110 and the second body 120 attached to each other.

The structure and shape of the first bending portion 140 may be deformed in various manners.

Figure 11:
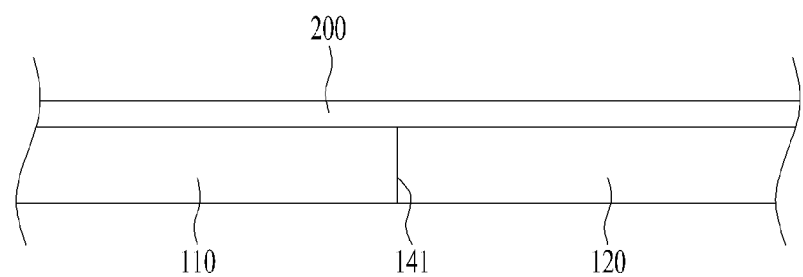
FIGS. 11 to 13 are views showing an exemplary shape of a bending portion when the display device according to an embodiment of the present invention is bent according to the configuration of the bending portion.
Figure 11:
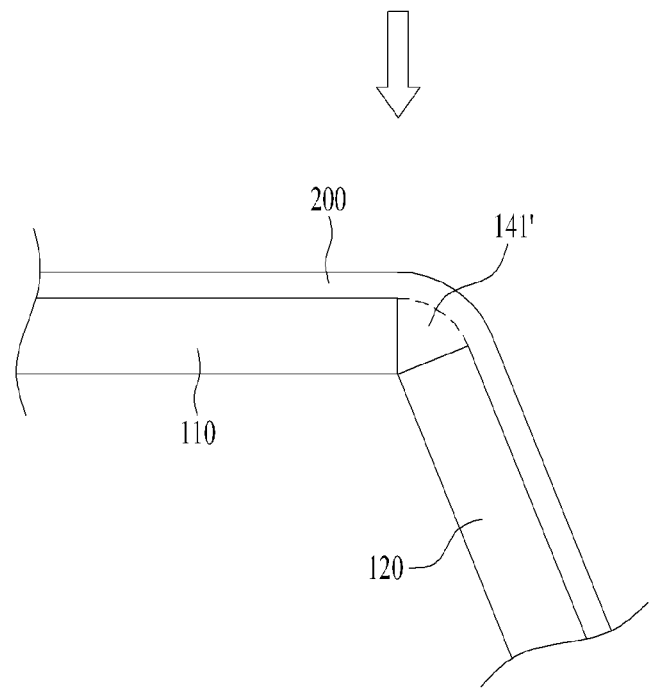
Figure 12:
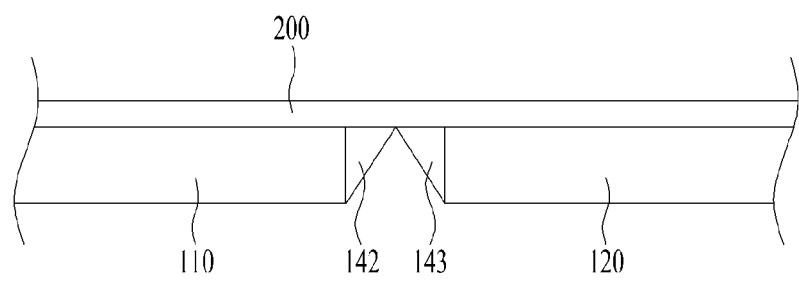
Figure 12:
Figure 12:
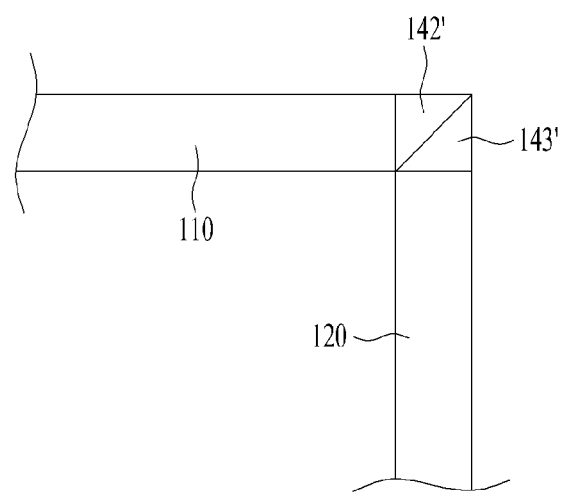
Figure 13:
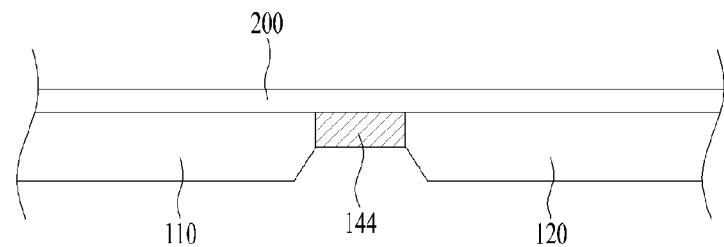
Figure 13:
Figure 13:
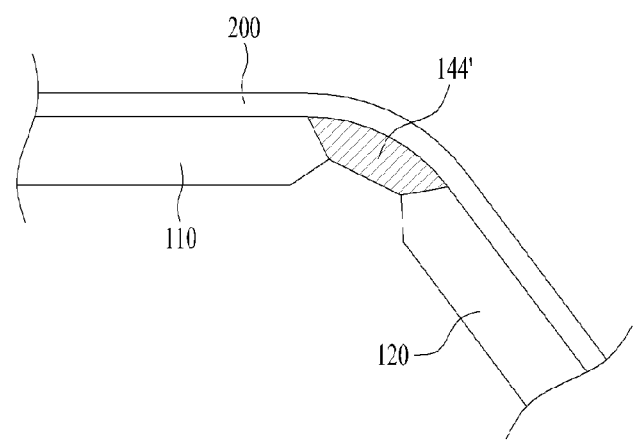

FIGS. 11 to 13 are views showing an exemplary shape of a bending portion when the display device according to an embodiment of the present invention is bent according to the configuration of the bending portion.

Referring to FIG. 11, the first bending portion 141 may be configured as a sliding type. If the second body 120 is rotated clockwise on the first bending portion 141, the first bending portion 141' may be deformed in shape as its upper end slides in a fan-like pattern. Moreover, the flexible display screen 200 may be folded as it slides together with sliding of the first bending portion 141.

Referring to FIG. 12, the first bending portion 140 may comprise a first block 141 and a second block 143. The first block 142 is attached to the first body 110, and the second block 143 is attached to the second body 120. The first block 142 and the second block 143 have a triangular shape, and the two blocks 142 and 143 may be connected at a vertex. Accordingly, if the second body 120 is rotated clockwise at 90°, a surface of the first block 142' and a surface of the second block 143' may overlap with each other.

Referring to FIG. 13, the first bending portion 140 may be formed as a flexible body 144. For example, the flexible body 144 may be provided between the first body 110 and the second body 120. If the second body 120 is rotated clockwise, the flexible body 144' is stretched in a predetermined direction, thus rendering the flexible display screen 200 foldable. The tensile strength of the flexible body 144' may vary from region to region, and the tension of a surface adjoining the flexible display screen 200 may be better than that of a surface not adjoining the flexible display screen 200.

The following description will be made on the attachment between body regions or between a body region and a flexible display screen region, which is achieved by bending the first body 110 and/or the third body 130, to form a full body screen.

Figure 14:
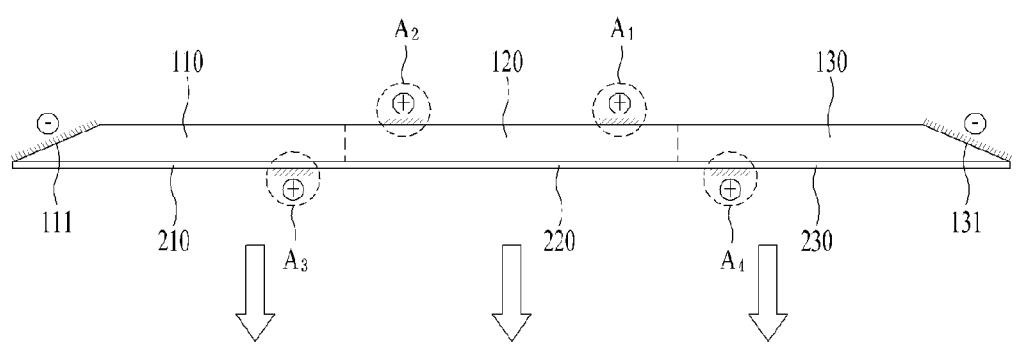
FIG. 14 is a view showing an example of a region applied with a magnetic property in the display device according to an embodiment of the present invention.

FIG. 14 is a view showing an example of a region applied with a magnetic property in the display device according to an embodiment of the present invention.

Referring to FIG. 14, predetermined regions of the flexible display screen 200 of the body 100 of the display device according to an embodiment of the present invention may be rendered magnetic.

For example, the sloping surface 111 of the first body 110 and the sloping surface 131 of the third body 130 may have a first polarity.

A predetermined region A1 of the second body to which the sloping surface 111 of the first body 110 is to be attached by clockwise rotation may have a second polarity opposite to the first polarity.

With the sloping surface 111 of the first body 110 being attached to the region A1, a region A3 of the first screen 110 to which the sloping surface 131 of the third body 130 having the first polarity is to be attached by counterclockwise rotation may have the second polarity (e.g., + polarity) opposite to the first polarity (e.g., − polarity).

Because the display device according to an embodiment of the present invention has a symmetrical structure, a region A3 of the second body to which the sloping surface 131 of the third body 130 having the first polarity (e.g., − polarity) is to be attached may have the second polarity (e.g., + polarity) by taking into account the case in which the third body 130 is rotated before the first body 110 is rotated.

Moreover, a region A4 of the third screen 230 to which the sloping surface 111 of the first body 110 having the first polarity (e.g., − polarity) is to be attached by counterclockwise rotation may have the second polarity (e.g., + polarity).

Hereinafter, the present invention will be described in more detail with reference to FIGS. 15 to 18.

FIGS. 15 to 18 are views showing an example of the regions applied with a magnetic property shown in FIG. 14 when the display device according to an embodiment of the present invention is in an open state.

Figure 15:
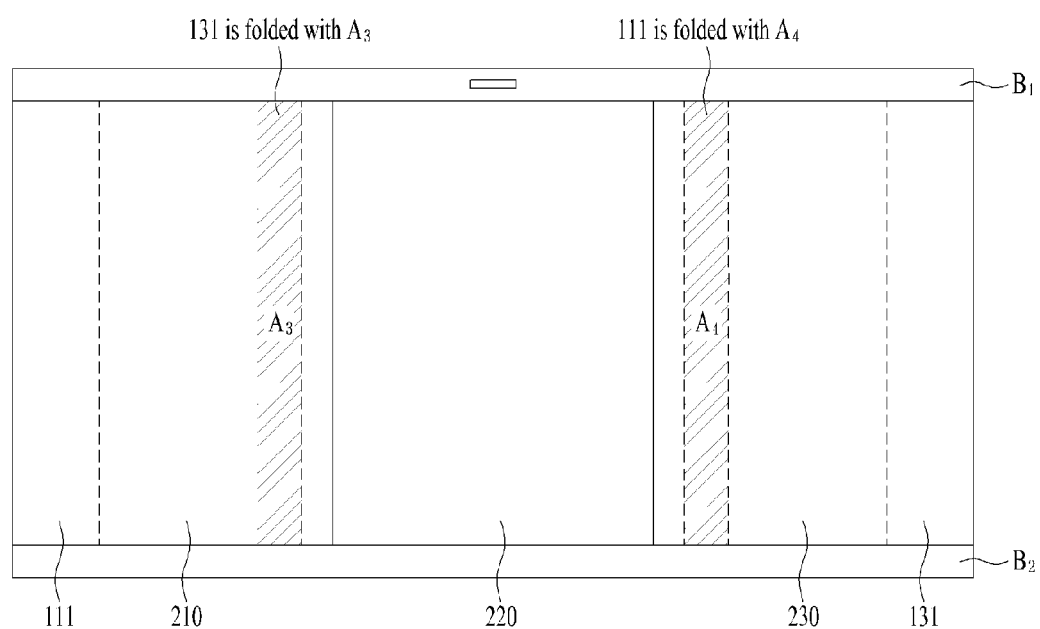
FIGS. 15 to 18 are views showing an example of the regions applied with a magnetic property shown in FIG. 14 when the display device according to an embodiment of the present invention is in an open state.

Referring to FIGS. 14 to 15, when the display device according to an embodiment of the present invention is in an unfolded state, the first screen 210, the second screen 220, and the third screen 230 are exposed to the outside. Moreover, the display device may comprise predetermined bezel areas B1 and B2 formed on the upper and lower edges of the screen.

The region A3 of the first screen 210 is a region having the '+ polarity', which may be coupled to the sloping surface 131 of the third body 130 based on attraction caused by a magnetic force.

Meanwhile, the display device according to an embodiment of the present invention is capable of selectively controlling the magnetic property of specific regions of the first screen 210 and the third screen 230 according to the structural characteristics of the display device.

For instance, a bending portion may comprise a bending sensor (not shown), and the bending sensor may detect the rotation of the first body 110. If the first body 110 is rotated clockwise, a controller (not shown) of the display device can control the display so that the region A3 of the first screen 210 has a specific magnetism.

If the first body 110 returns to the original state from the bent state, the bending sensor senses this, and the controller (not shown) of the display device controls the display to remove the polarity of the region A3 of the first screen 210.

In the case that a material having a predetermined magnetism exists on the first screen 210 and the third screen 230, distortion may be present in an image displayed through the first screen 210 and the third screen 230. Accordingly, if the flexible display screen 200 of the display device is fully unfolded, the first screen 210 and the third screen 230 do not need to be coupled to a specific body region by a magnetic force. Thus, it is preferable to remove the polarity of the region A3 and the region A4.

However, if the first screen 210 and the third screen 230 are rotated in respective predetermined directions to cause only the second screen 220 to face the front, and the other screens 210 and 230 are present on the rear or inside the body, the controller (not shown) of the display device can control the physical properties of the display so that the region A3 and the region 4 may have a predetermined magnetism.

Figure 16:
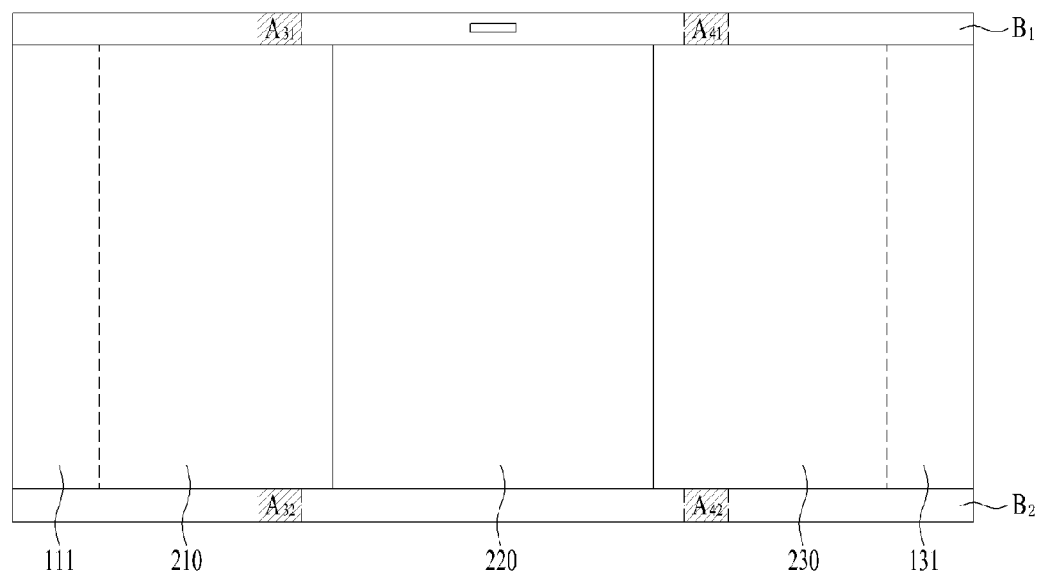

As shown in FIG. 16, the magnetic regions on the flexible display screen 200 comprising the first screen 210, the second screen 220, and the third screen 230 may be not the first screen 210 and/or third screen 230, but the bezel areas B1 and B2 of the flexible display screen 200.

For example, referring to FIG. 16, magnetism of a predetermined polarity may be applied to regions A31, A32, A41, and A42, and the region A31 and/or the region A32 may be magnetically coupled to the sloping surface of the third body 130 by the rotation of the third body 130. The region A41 and/or the region A42 may be magnetically coupled to the sloping surface 111 of the first body 111 by the rotation of the first body 110.

Figure 17:
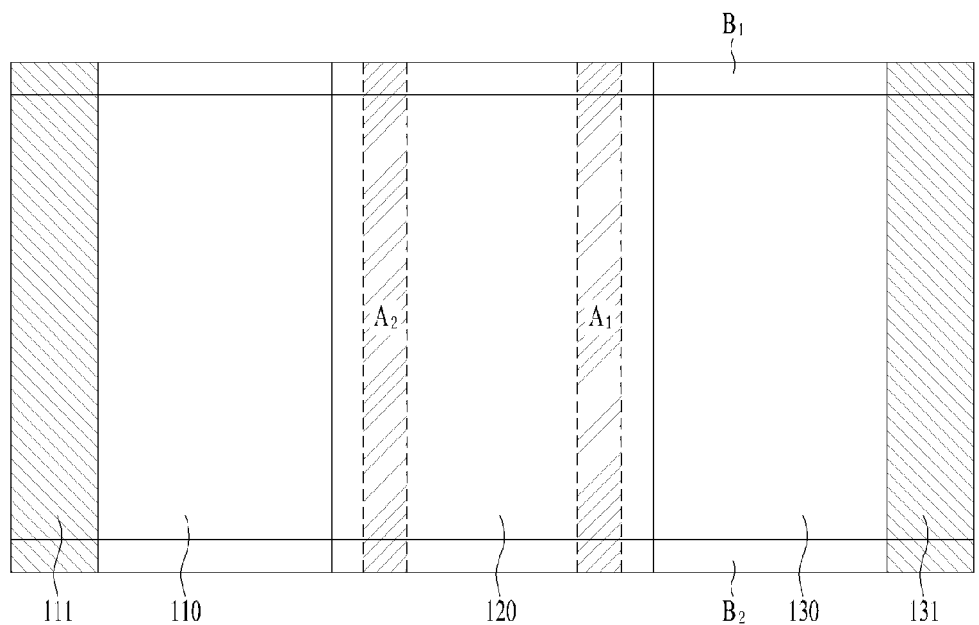

FIG. 17 shows the body 100 supporting the flexible display screen 200.

Referring to FIG. 17, the sloping surface 111 of the first body 110 and the sloping surface 131 of the third body 130 each may have the first polarity (e.g., − polarity). Also, the regions A1 and A2 of the second body 120 to be coupled to the sloping surfaces 111 and 131 by rotation may have the second polarity (e.g., + polarity) opposite to the first polarity.

As described above, the regions in which the sloping surface 111 of the first body and the sloping surface 131 of the third body have the first polarity (e.g., − polarity) may be the entire regions of the sloping surfaces 111 and 131, or alternately may be limited to the bezel areas 111a, 111b, 131a, and 131b.

Figure 18:
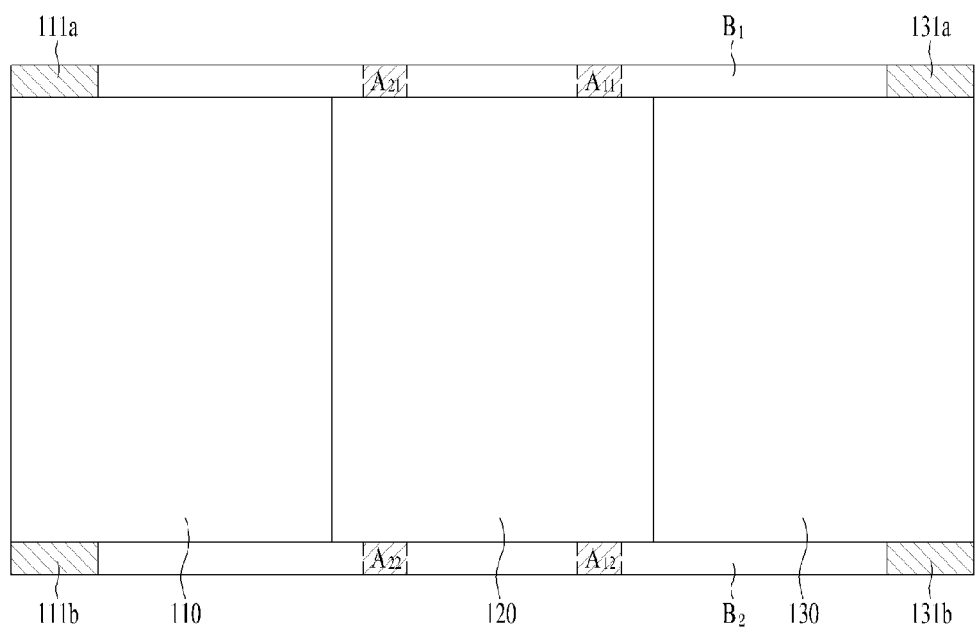

Referring to FIG. 18, the regions A1 and A2 of the second body 120 to be coupled to the sloping surfaces 111 and 131 by rotation may have the second polarity (e.g., + polarity) opposite to the first polarity.

The regions of the second body 120 magnetically coupled to the bezel areas 111a and 111b having the first polarity (e.g., − polarity) also may be limited to A21, A22, A11, and A12.

Accordingly, in the display device according to an embodiment of the present invention, the regions magnetically coupled by the rotation of the first body 110 and the third body 130 may be part of the bezel areas A21, A22, A11, and A12.

Figure 19:
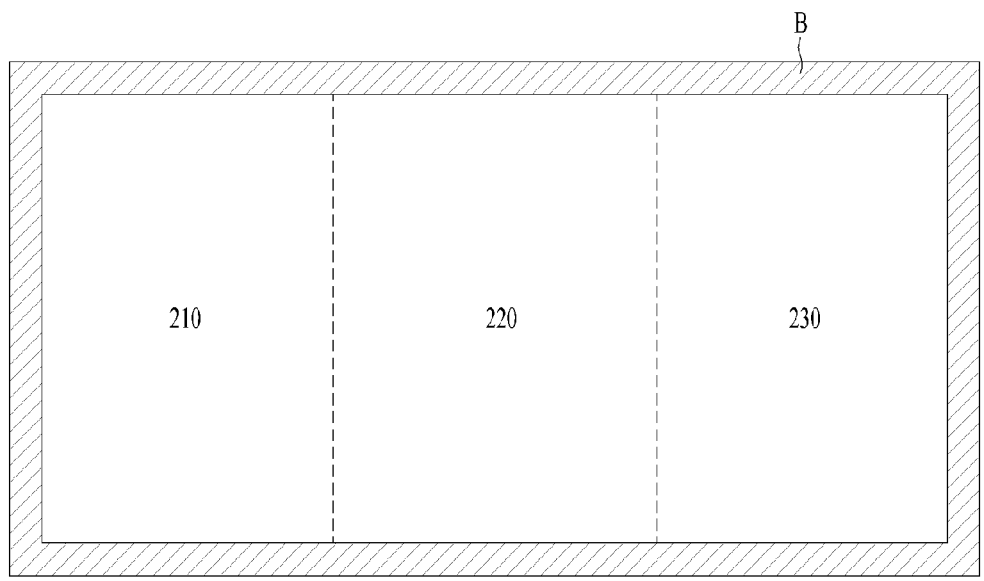
FIG. 19 is a view showing another example of a bezel structure of the display device according to an embodiment of the present invention.

FIG. 19 is a view showing another example of a bezel structure of the display device according to an embodiment of the present invention.

Although the display device referred in FIGS. 15 to 18 comprises bezel areas B1 and B2 formed on the upper and lower edges of the flexible display screen 200, the present invention is not limited thereto.

For example, as shown in FIG. 19, the flexible display screen 210, 220, and 230 may comprise a bezel area B formed on the upper edge, lower edge, left edge, and right edge.

A predetermined region of the bezel area B may comprise a predetermined magnetism so as to be magnetically coupled by the rotation of the first screen 210 and/or third screen 230. Further, the magnetic characteristic of the predetermined region of the bezel area B may be controlled so as to have a predetermined magnetic property depending on the amount of rotation of the first screen 210 and/or the third screen 230.

Figure 20:
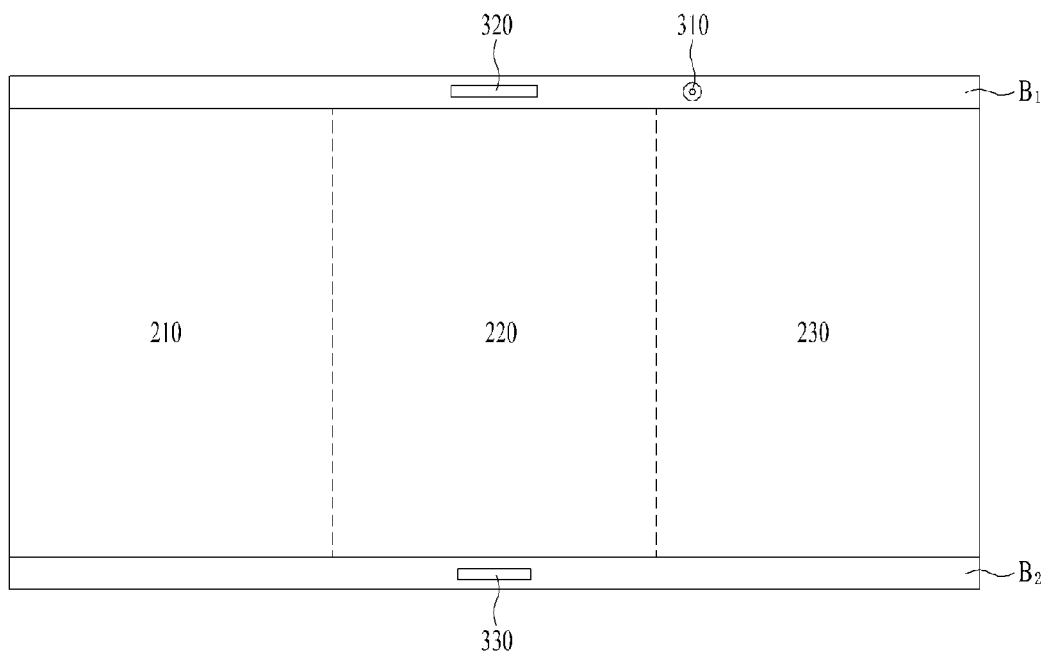
FIG. 20 is a view showing an example of the display device according to an embodiment of the present invention in an open state.
Figure 21:
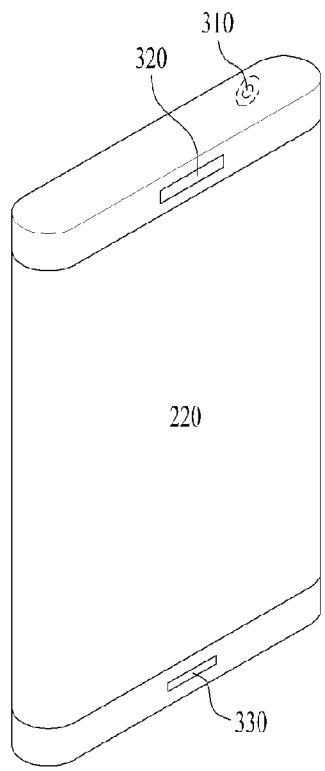
FIGS. 21 and 22 are views showing an example of the display device according to an embodiment of the present invention in a closed state.
Figure 22:
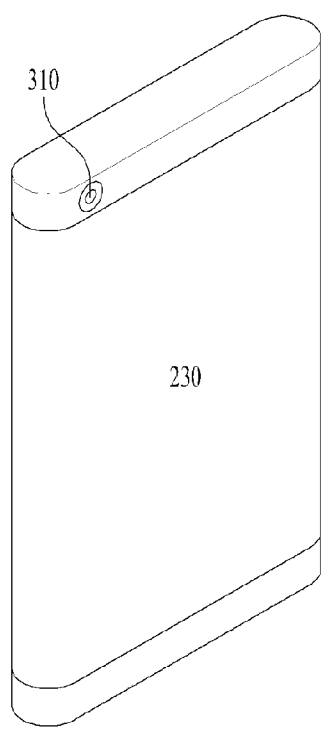

FIG. 20 is a view showing an example of the display device according to an embodiment of the present invention in an open state. FIGS. 21 and 22 are views showing an example of the display device according to an embodiment of the present invention in a closed state.

Referring to FIG. 20, the display device may comprise a camera module 310 on any of the first body 110 and the third body 130.

The display device may comprise a speaker 320 and a microphone 330 on the second body 120.

The camera module 310 may be provided in a corresponding bezel area B1 of the third body 130, and the speaker 320 and the microphone 330 each may be provided in a corresponding bezel area B2 of the second body 120.

The camera module 310 may be used as a front camera or rear camera according to the structural characteristics of the display device.

For instance, as shown in FIG. 20, when the flexible display screen 200 is fully unfolded, the camera module 310 disposed in a specific one of the bezel areas of the screen supported by the third body 130 may be used as the front camera.

Moreover, for instance, referring to FIGS. 21 and 22, only the second screen 220 of the flexibly display screen 200 may be exposed to the front, the third screen 230 may be exposed to the rear, and the first screen 210 may be exposed to neither the front nor the rear. In this case, the camera module 310 provided in the corresponding bezel area of the third screen 230 may be used as the rear camera.

That is, in accordance with an implemented embodiment, if only the second screen 220 is exposed to the front, the display device may operate in the cellular phone mode (first mode). Moreover, if all of the first screen 210, the second screen 220, and the third screen 230 are exposed to the front, the display device may operate in the smart pad mode (second mode).

Meanwhile, in the case that the display device according to an embodiment of the present invention is in any of the first and second modes, the power of the screen can be controlled according to the mode.

Figure 23:
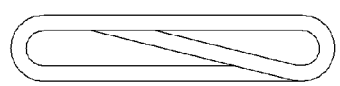
FIGS. 23 and 24 are views for explaining an example of controlling the power of a display unit depending on whether the display device according to an embodiment of the present invention is opened or closed.
Figure 23:
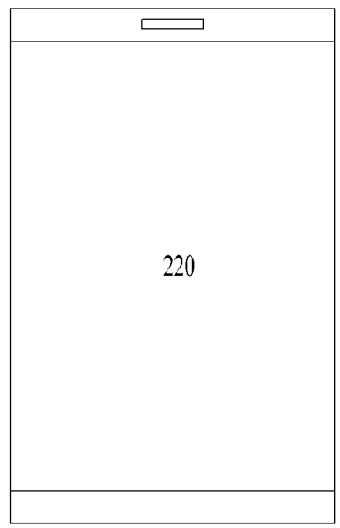
Figure 24:
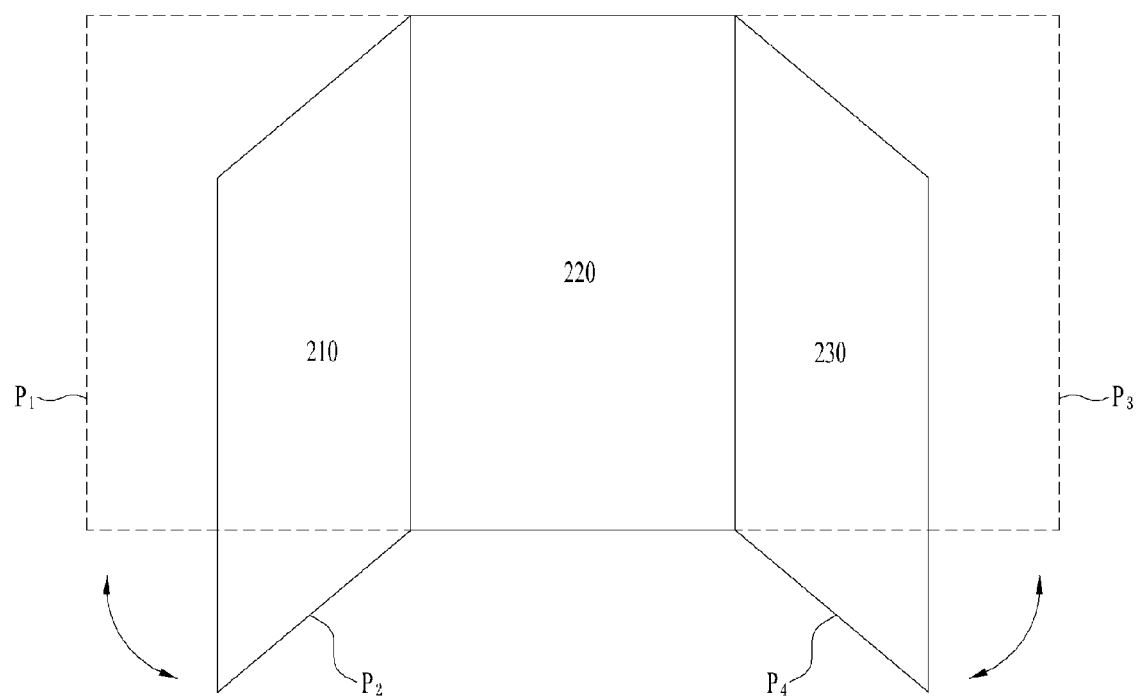

FIGS. 23 and 24 are views for explaining an example of controlling the power of a display unit depending on whether the display device according to an embodiment of the present invention is opened or closed.

Referring to FIG. 23, the bending sensor (not shown) is able to sense a bent state of the first body 110 and/or the third body 120. Then, the controller (not shown) of the display device recognizes that the display device operates in the first mode, and powers on only the second screen 220 exposed to the front and powers off the first screen 210 and the third screen 230.

Referring to FIG. 24, if the first screen 210 is at a position P1, the power is in the on state. However, as the first screen 210 is bent at the position P1 in a direction P2, the controller (not shown) can cut off the power supply of the first screen 210.

Likewise, as the third screen 230 is bent at a position P3 in a direction P4, the controller (not shown) can cut off the power supply of the third screen 230.

Accordingly, power consumption can be reduced, with the structural characteristics and use of the display device taken into account.

In the display device according to an embodiment of the present invention, the first body 110, the second body 120, and the third body 130 have the same length. Also, the first screen 210, the second screen 220, and the third screen 230 are equally divided from each other. The following description will be made about an example of equally dividing the bodies or screens.

Figure 25:
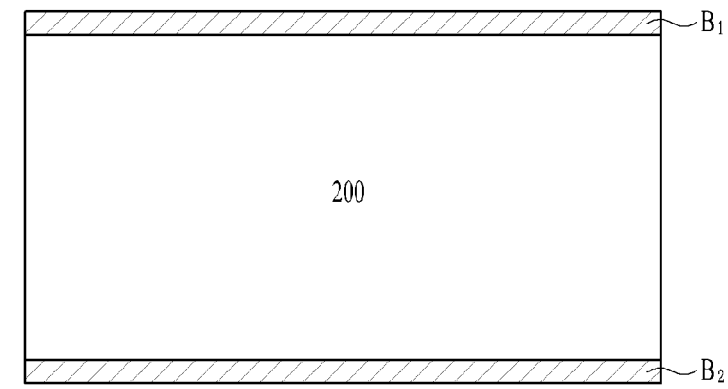
FIGS. 25 and 26 are views for explaining an example of equally dividing the flexible display screen in accordance with the bezel structure of the display device according to an embodiment of the present invention.
Figure 25:
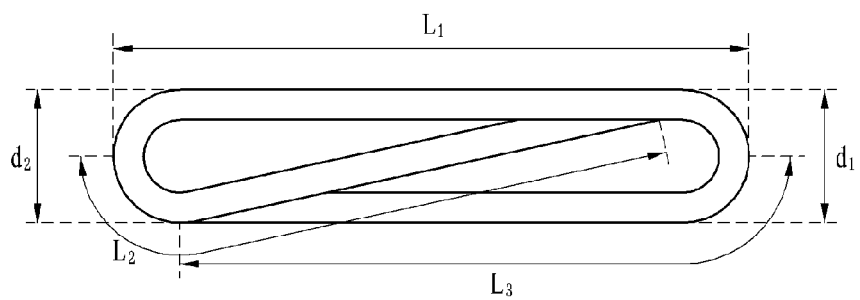
Figure 26:
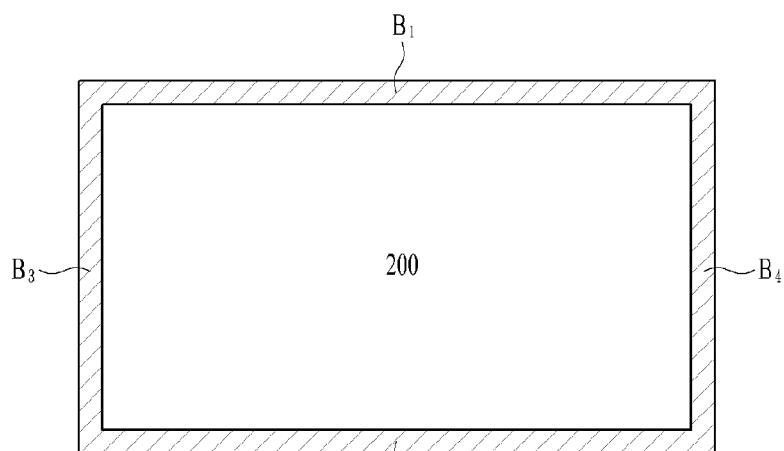
Figure 26:
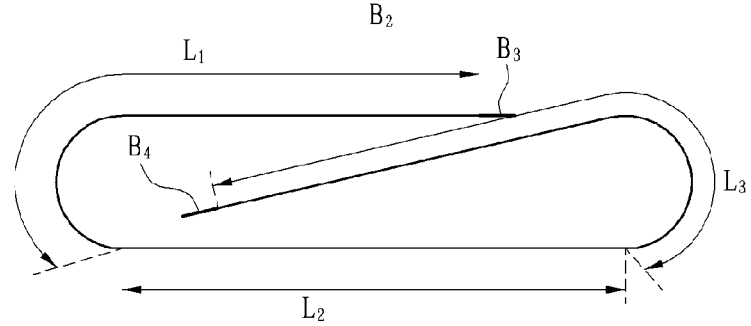

FIGS. 25 and 26 are views for explaining an example of equally dividing the flexible display screen in accordance with the bezel structure of the display device according to an embodiment of the present invention.

Referring to FIG. 25, the flexible display screen 200 of the display device may comprise bezel areas B1 and B2 on the upper and lower edges.

If both of the first body and the third body are rotated and folded, the length L1, L2, and L3 of each body is equal as seen from FIG. 25. Moreover, the height or thickness d1 and d2 formed by folding each body is equal, too.

Referring to FIG. 26, the upper edge, lower edge, left edge, and right edge of the flexible display screen 200 of the display device are all surrounded by the bezel areas B, B2, B3, and B4.

In this case, if both of the first body and the third body are rotated and folded, L1, L2, and L3, which do not include the length of the bezel area B3 of the right edge and the length of the bezel area B4 of the right edge, are equal to each other.

Figure 27:
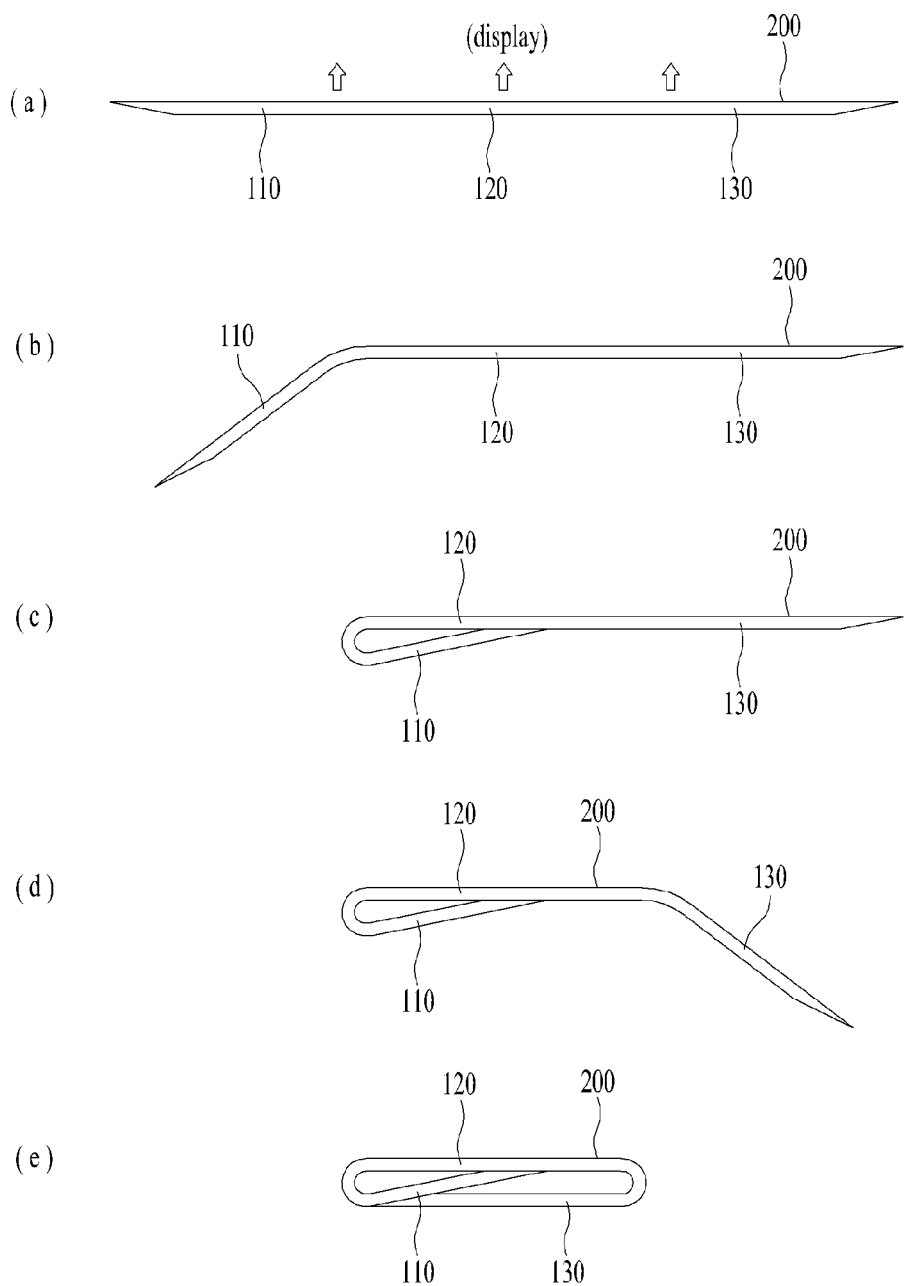
FIGS. 27 and 28 are views exemplifying the order of folding the display device according to an embodiment of the present invention.
Figure 28:
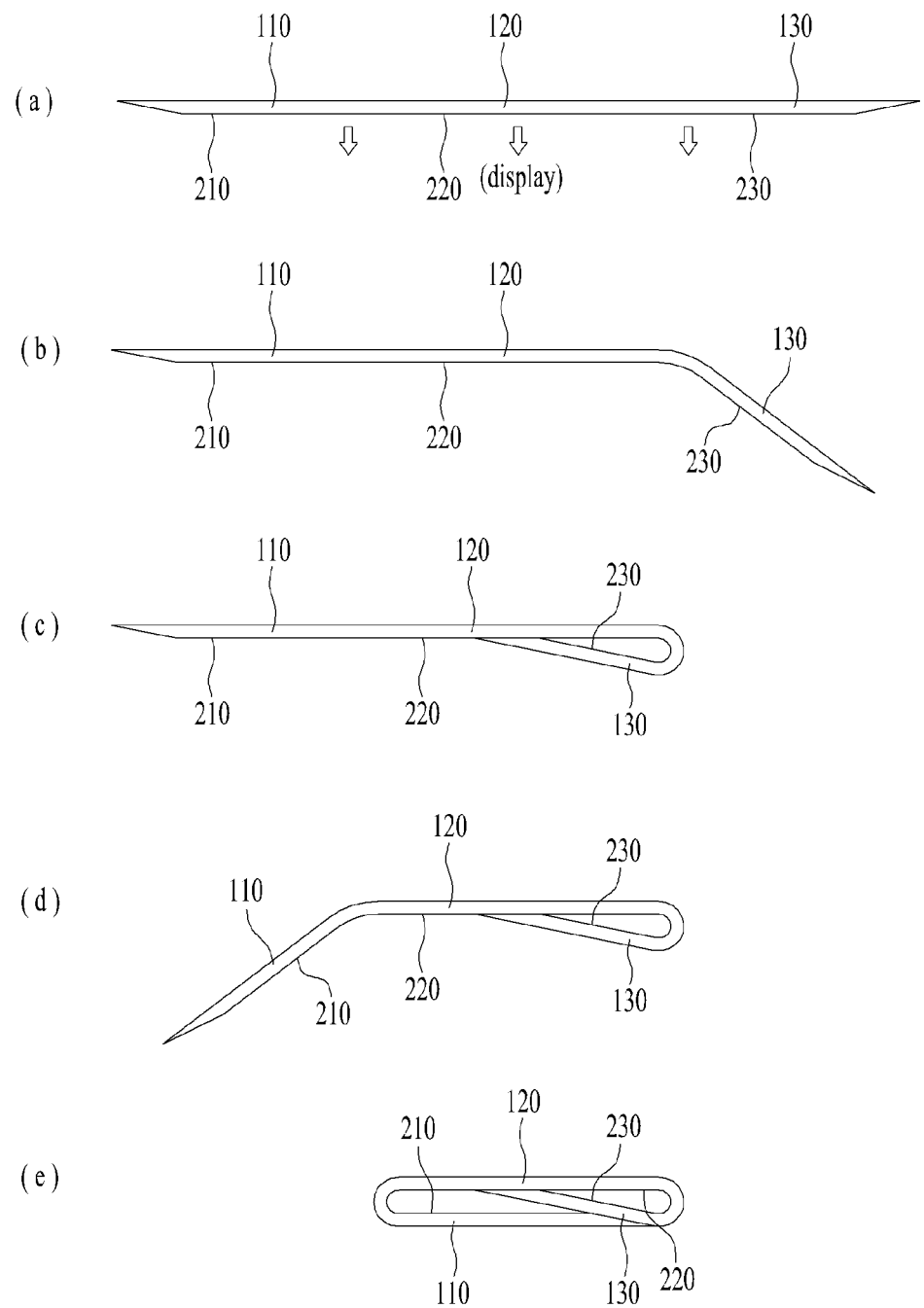

FIGS. 27 and 28 are views exemplifying the order of folding the display device according to an embodiment of the present invention.

Referring to FIG. 27, in the display device, when the flexible display screen 200 and the body 100 supporting the flexible display screen 200 are unfolded (a), the first body 110 is rotated counterclockwise and is connected to the second body (b). Afterwards, the third body 130 is rotated clockwise (c) and is connected to the first body 110 connected to the second body 120 (d).

Accordingly, all the screens are exposed to the outside, thereby realizing a full body screen. That is, the first body 110 and the third body 130 are configured to be rotated so as to expose the flexible display screen 200 to the outside.

However, as discussed above, the display device according to an embodiment of the present invention may be implemented in such a manner that none of the screens are exposed to the outside upon rotation of the first body and the third body.

Referring to FIG. 28, in the display device according to an embodiment of the present invention, the first body 110, the second body 120, and the third body 130 may be sequentially connected to each other, and the first bending portion 140 may be provided between the first body 110 and the second body 120, and the second bending portion 150 may be provided between the second body 120 and the third body 130 (a).

The flexible display screen 200 may comprise the first screen 210 supported by the first body 110 and comprising a sloping surface on a cross-section of the first body 110, the second screen 220 supported by the second body 120, and the third screen 230 supported by the third body 130 and comprising a sloping surface on a cross-section of the third body 130.

The first screen 210, the second screen 220, and the third screen 230 may form a continuous screen.

By clockwise rotation of the third body 130 (b), the sloping surface of the third screen 230 may be attached to the first screen 210 (c).

Thereafter, by counterclockwise rotation of the first body 110 (d), the first body 110 may be attached to the third body 230 supporting the third screen 230 attached to the first screen 210 (e).

Accordingly, the entire parts of the flexible display screen 200 are not exposed to the outside, but only the bodies are exposed to the outside.

In this way, once the first body 110 and the third body 130 are folded in such a manner that the flexible display screen 200 is not exposed to the outside, the display device according to an embodiment of the present invention can operate the flexible display screen 200 in three modes.

For example, the body may have an open configuration that exposes all of the first screen 210, the second screen 220, and the third screen 230 to the outside.

Alternatively, the body may have a partially closed configuration that exposes only the third screen to the outside as the first body 110 is rotated to attach the sloping surface of the first screen to the second screen.

Alternatively, the body may have a closed configuration that exposes none of the first to third screens to the outside as the third body 130 is rotated to attach the sloping surface of the third screen 230 to the first body when the sloping surface of the first screen 210 is attached to the second screen 220 by the rotation of the first body 110.

Although the flexible display screen explained with reference to FIG. 28 has been described to comprise a sloping surface, the sloping surface may correspond to a body, and the flexible display screen may be composed of a flat panel with no sloping surface.

Figure 29:
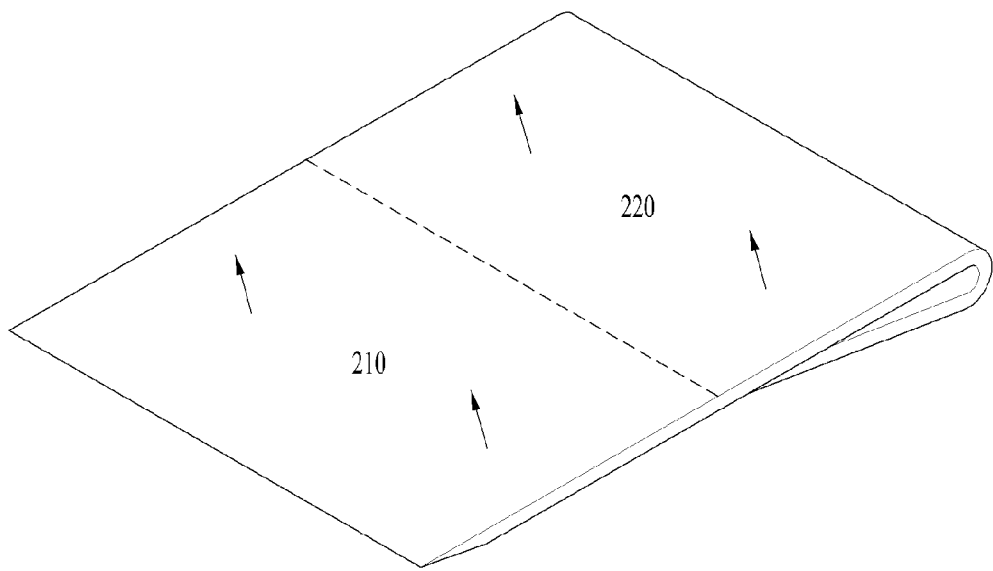
FIGS. 29 to 31 are views for explaining various uses of the display device according to an embodiment of the present invention.
Figure 30:
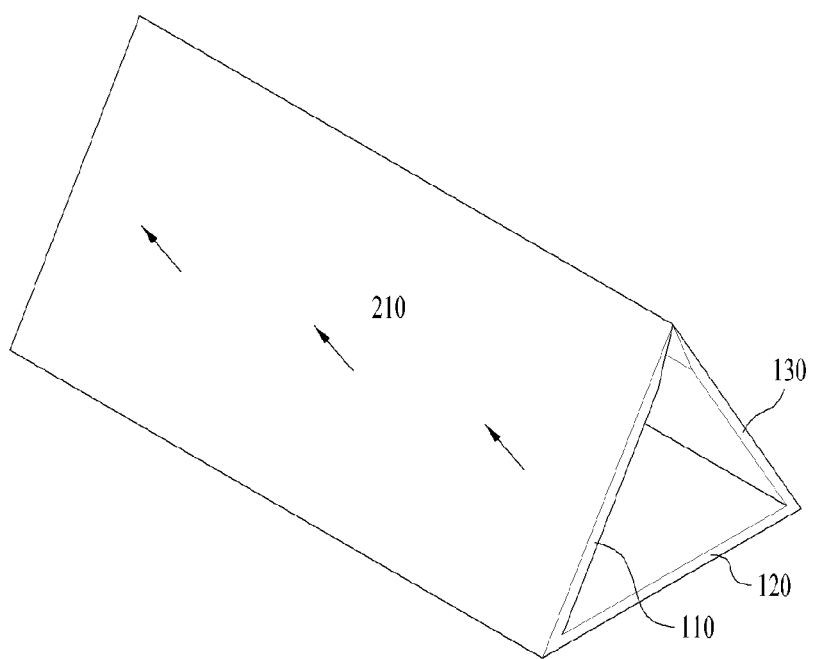
Figure 31:
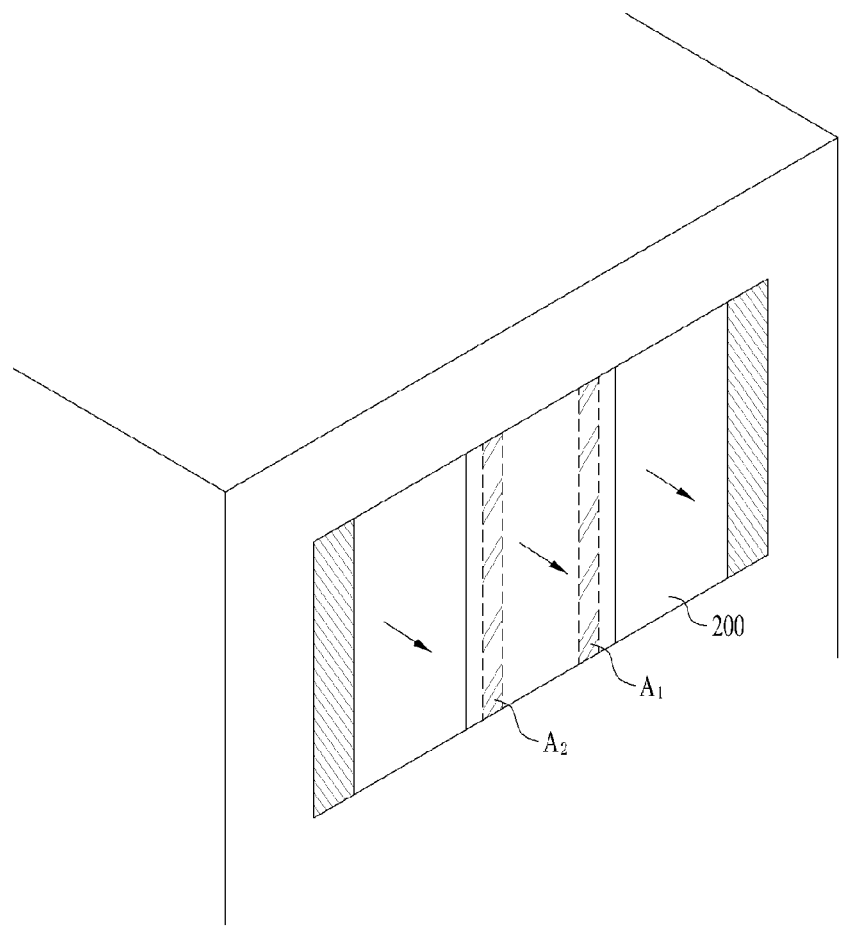

FIGS. 29 to 31 are views for explaining various uses of the display device according to an embodiment of the present invention.

Referring to FIG. 29, the first screen 210 and the second screen 220 can be used when only the third body 130 is rotated and folded. Also, it is convenient to use the first screen 210 and the second screen 220 because of a slope of the folded third body 130.

Referring to FIG. 30, unlike the aforementioned examples, the first body 110 and the third body 130 can be connected together. More specifically, it is possible to use the first screen 210 and the third screen 230 by connecting the corner of the sloping surface of the first body 100 and the corner of the sloping surface of the third body 131. In this case, the display device itself can be used as a holder.

Referring to FIG. 31, as shown in FIGS. 17 and 18, the regions A1 and A2, among the regions of the body 100 on the rear, are regions having a predetermined magnetism when the entire parts of the flexible display screen 200 is unfolded. This allows the display device to be easily attached to an external magnetic object.

Hereinafter, a description will be given of an aspect ratio of a display device according to an embodiment of the present invention in a case in which the display device is folded.

Figure 32:
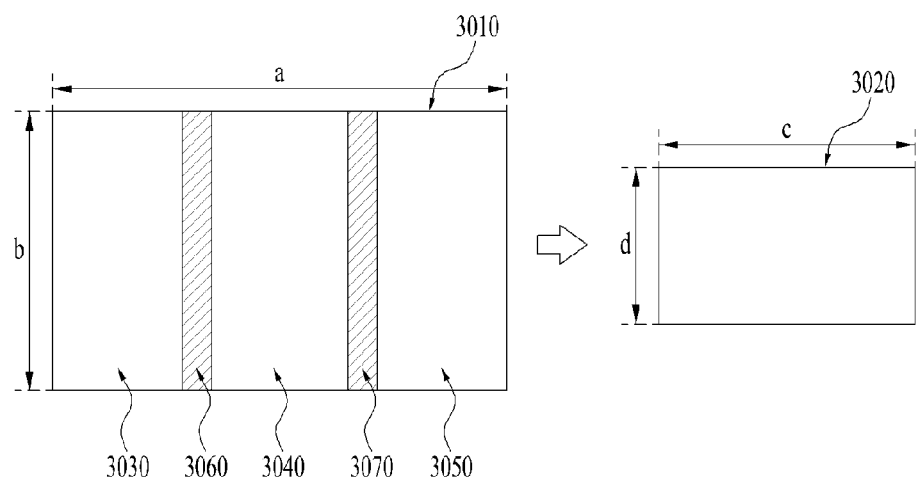
FIG. 32 is a view for showing a display screen before and after a display device is folded according to an embodiment of the present invention.

FIG. 32 is a view showing a display screen before and after a display device according to an embodiment of the present invention is folded.

Figure 33:
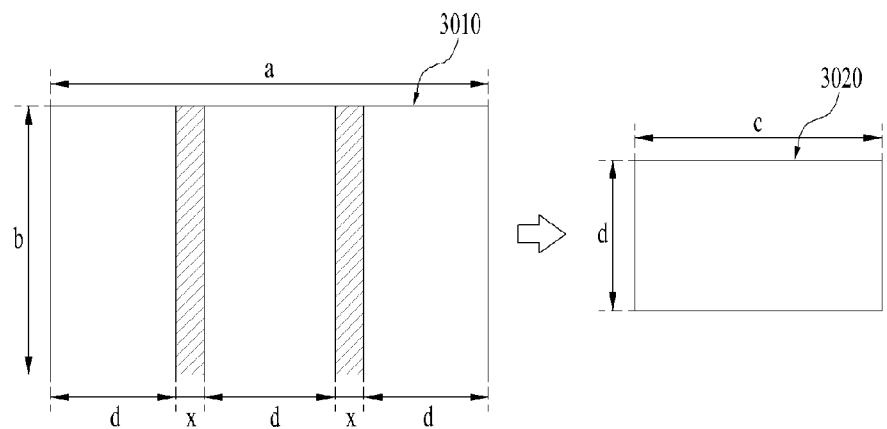
FIG. 33 is a view for showing a display device including display screens having a uniform aspect ratio before and after the display device is folded according to an embodiment of the present invention.

The left part of FIG. 32 shows a flexible display screen 3010 of the display device before the display device is folded, and the right part of FIG. 32 shows a portion 3020 of the flexible display screen 3010 of the display device after the display device is folded. As previously described, the flexible display screen 3010 of the display device according to the embodiment of the present invention may include a first screen 3030 supported by a first body, a second screen 3040 supported by a second body, and a third screen 3050 supported by a third body. Also, the display device according to the embodiment of the present invention may include a first bending portion 3060 provided between the first body supporting the first screen 3030 and the second body supporting the second screen 3040 to support a boundary portion between the first screen 3030 and the second screen 3040 and a second bending portion 3070 provided between the second body supporting the second screen 3040 and the third body supporting the third screen 3050 to support a boundary portion between the second screen 3040 and the third screen 3050. As shown in the drawing, the first screen 3030, the second screen 3040, and the third screen 3050 have substantially the same size. The first bending portion 3060 and the second bending portion 3070 are located at the rear of the flexible display screen 3010. In FIGS. 32 and 33, the first bending portion 3060 and the second bending portion 3070 are shown in front views for the sake of convenience.

When the display device is folded, one of the first, second, and third screens 3030, 3040, and 3050 is located at the front of the display device, and another of the first, second, and third screens 3030, 3040, and 3050 is located at the rear of the display device. The screen 3020 shown in the right part of FIG. 32 is a screen located at the front or the rear of the folded display device. Consequently, the screen 3020 shown in the right part of FIG. 32 is one of the first, second, and third screens 3030, 3040, and 3050.

The display screen of the display device is designed to have a predetermined aspect ratio. In the embodiment shown in FIG. 32, the flexible display screen 3010 of the display device before the display device is folded has an aspect ratio of a:b, and the display screen 3020 of the display device after the display device is folded has an aspect ratio of c:d. The display device may be designed such that the display screens of the display device before and after the display device is folded do not have different aspect ratios but have the same aspect ratio. In this case, better user experiences may be provided to users.

That is, if the aspect ratios of the display screens of the display device before and after the display device is folded are different from each other, contents displayed on the display screen of the display device before the display device is folded may be displayed in a state in which the display screen has black bars or in a state in which the aspect ratio of the display screen is changed. As a result, the contents may not be consistently displayed. In addition, it may be necessary to perform additional processing due to the change in display of contents, such as an aspect ratio. Hereinafter, therefore, a display device having the same aspect ratio before and after the display device is folded will be described. In the following description, a longer length of the display screen will be referred to as a horizontal length of the display screen, and a shorter length of the display screen will be referred to as a vertical length of the display screen, irrespective of whether the longer length or the shorter length of the display screen is an x axis length or a y axis length, which is perpendicular to the x axis length.

FIG. 33 is a view showing a display device including display screens having a uniform aspect ratio before and after the display device is folded according to an embodiment of the present invention.

Referring to FIG. 33, it is assumed that display screens of the display device have a uniform aspect ratio of a:b. Consequently, the display device according to the embodiment of the present invention is designed such that an aspect ratio a:b of the display screen 3010 before the display device is folded is equal to an aspect ratio c:d of the display screen 3020 after the display device is folded.

In FIGS. 32 and 33, it is assumed that the horizontal length of the flexible display screen before the display device is folded is a, and the vertical length of the flexible display screen before the display device is folded is b. Also, it is assumed that the horizontal length of the display screen after the display device is folded is c, and the vertical length of the display screen after the display device is folded is d. The symbols a, b, c, and d may be positive integers and may be expressed in inches or centimeters.

The vertical length b of the flexible display screen 3010 before the display device is folded corresponds to the horizontal length c of the display screen 3020 after the display device is folded. That is, c=b. The horizontal length a of the flexible display screen 3010 before the display device is folded corresponds to the sum of the width of the first screen, the width of the second screen, the width of the third screen, the width of the first bending portion, and the width of the second bending portion. The display device may be designed such that the first screen, the second screen, and the third screen constituting the flexible display screen before the display device is folded have the same size and thus the same aspect ratio. In other words, the horizontal length a of the flexible display screen 3010 before the display device is folded corresponds to the sum of the width d of the first screen, the width d of the second screen, the width d of the third screen, the width x of the first bending portion, and the width x of the second bending portion (a=d+d+d+x+x=3d+2x). The width d of the first screen, the width d of the second screen, or the width d of the third screen corresponds to the vertical length d of the display screen 3020 after the display device is folded.

In a case in which the display screens before and after the display device is folded have the same aspect ratio, if the size and the aspect ratio of the flexible display screen 3010 before the display device is folded are set, the size of the display screen 3020 after the display device is folded is set accordingly. Specifically, as shown in FIG. 33, the size of the flexible display screen 3010 before the display device is folded may be set to have a horizontal length of a and a vertical length of b according to the aspect ratio a:b. In this case, the display screen 3020 after the display device is folded has an aspect ratio corresponding to the aspect ratio a:b. As previously described, c=b. Consequently, the length d corresponds to a value obtained by dividing the square of b by a, which is expressed as follows.

$a:b=c:d, b=c$ $b*c=a*d$ $d=(b*c)/a=b^2/a$

Meanwhile, the width x of the first bending portion and the width x of the second bending portion may be calculated as follows.

$a=3d+2x,$ $x=(a-3d)/2,$ and $d=b^2/a$

Consequently, $$x = (a^2 - 3b^2)/2a \left( x = \frac{a^2 - 3b^2}{2a} \right)$$

Where, x is a positive integer. That is, x>0, and therefore, $(a^2-3b^2)>0$.

Consequently, $a>\sqrt{3}b$

Where, $\sqrt{3}\approx 1.7302$. In this embodiment, therefore, it may be necessary for the aspect ratio a:b to be greater than about 1.7302 in order that the display screens before and after the display device is folded have the same aspect ratio.

In conclusion, in a case in which the three division type foldable display device according to the embodiment of the present invention has an aspect ratio a:b of greater than about 1:1.7302, the aspect ratio of each of the first to third screens constituting the flexible display screen is set to $b^2:b^2/a$, and each of the first and second bending portions has a width of $$x = \frac{a^2 - 3b^2}{2a},$$

based on the aspect ratio a:b of the flexible display screen.

The width of each bending portion may be expressed based on the aspect ratio and the size of the flexible display screen. For example, it may be assumed that the horizontal length of the flexible display screen is a, the vertical length of the flexible display screen is b, and the aspect ratio of the flexible display screen is α:β. In this case, a:b=α:β. Consequently, the width of each bending portion may be expressed by $$\frac{a}{2}\left(1 - 3\left(\frac{\beta}{\alpha}\right)^2\right).$$

The horizontal and vertical lengths of the display screen based on the aspect ratio of the display screen may be changed within a range equivalent to about 5% of the horizontal and vertical lengths of the display screen in consideration of whether a bezel portion of the display screen is included and the width of the bezel portion if the bezel portion of the display screen is included. Although the embodiment of the present invention is described based on the aspect ratio and size of the entire screen in FIGS. 32 and 33, the same principle may be applied to an effective area (a portion excluding the bezel) of the screen on which an image is displayed.

Figure 34:
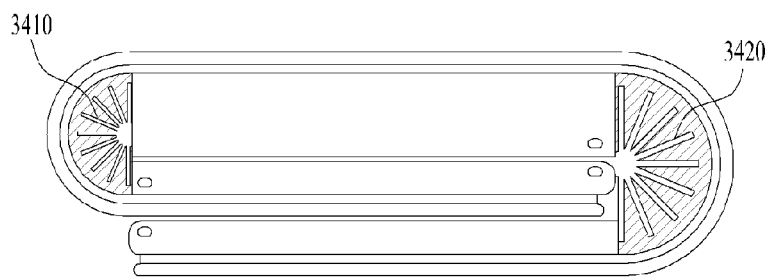
FIG. 34 is a diagram illustrating an example of a display device of which first bending portion and second bending portion are asymmetry to each other.

FIG. 34 is a diagram illustrating an example of a display device of which first bending portion and second bending portion are asymmetry to each other.

One embodiment of the display device of which first bending portion 141 and second bending portion 151 have the same size and bent curvature as each other has been described with reference to FIG. 4 and FIG. 6. However, as shown in FIG. 34, a first bending portion 3410 and a second bending portion 3420, which are asymmetry to each other, may be applied to the display device.

Figure 35:
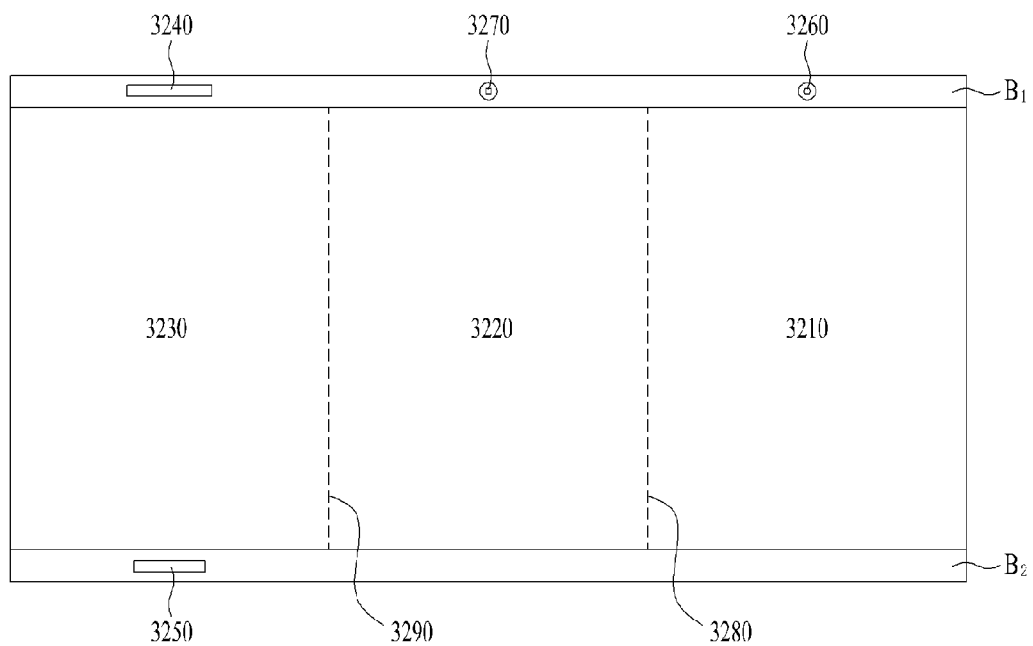
FIG. 35 is a diagram illustrating an example of a display device that includes at least two cameras.

FIG. 35 is a diagram illustrating an example of a display device that includes at least two cameras. In FIG. 35, the display device is opened.

The display device may include a first body supporting a first screen 3210, a second body supporting a second screen 3220, and a third body supporting a third screen 3230. The first screen 3210, the second screen 3220 and the third screen 3230 may be provided on the front side of the display device, and FIG. 35 illustrates the front side of the display device.

Also, the display device may include a first camera 3260 of first resolution in a bezel area B1 corresponding to the first body and a second camera of second resolution in a bezel area B1 corresponding to the second body. At this time, the first resolution of the first camera 3260 is higher than the second resolution of the second camera 3270, and the first camera 3260 and the second camera 3270 may be provided on the front side of the display device.

Also, the display device may include a first bending portion 3280 that connects the first body with the second body. Also, the display device may include a second bending portion 3290 that connects the second body with the third body.

Also, the display device may include a speaker 3240 in a bezel area B1 corresponding to the third body and a mike 3250 in a bezel area B2 corresponding to the third body.

In this case, the display device may activate at least one of the first camera 3260 and the second camera 3270 in accordance with its structural features or the location of the user. This will be described with reference to FIG. 39 to FIG. 45.

First of all, to activate at least one of the first camera 3260 and the second camera 3270, the structural features of the display device will be described.

Figure 36:
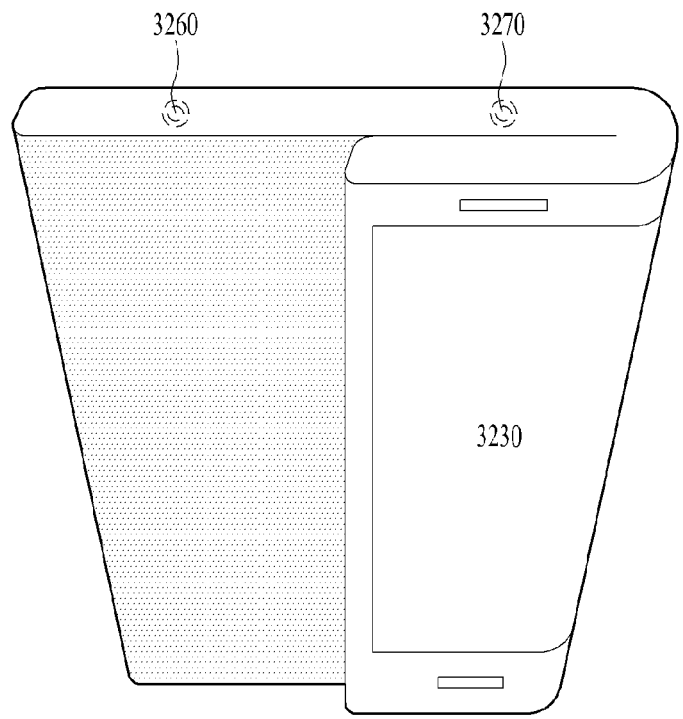
FIG. 36 is a diagram illustrating an example of a display device of which second bending portion is bent.

FIG. 36 is a diagram illustrating an example of a display device of which second bending portion is bent. To assist understanding, the display device of FIG. 36 will be described with reference to the display device of FIG. 35.

The first camera 3260 and the second camera 3270 may be provided on the side where the flexible display screen of the display device is provided. In other words, the first camera 3260 and the second camera 3270 may be provided on the same side without being split into the front side and the rear side of the display device. Accordingly, the first camera 3260 and the second camera 3270 may take the same direction unless the first bending portion 3280 is bent.

In this way, if the first camera 3260 and the second camera 3270 take the same direction, the display device may generate 3D image by using the first image acquired from the first camera 3260 and the 2D image acquired from the second camera 3270.

In other words, although the first camera 3260 and the second camera 3270 take the same direction, they are spaced apart from each other. Accordingly, the first camera 3260 may acquire the first image viewed by the left eye of the user, and the second camera 3270 may acquire the second image viewed by the right eye of the user. Accordingly, the display device may generate the 3D image by using the first image and the second image.

At this time, the display device may determine a location of a screen that provides a preview interface for displaying the 3D image in accordance with its mode. The mode of the display device may include a first mode for self photographing of the user who uses the display device, and a second mode for normal photographing of a background viewed by the user.

Accordingly, the display device of the second mode for normal photographing may provide the preview interface, which displays the 3D image generated or acquired using the first camera 3260 and the second camera 3270, to the third screen 3230 located on the front side of the user.

On the other hand, the display device of the first mode for self photographing may provide the preview interface to the first screen 3210 and the second screen 3220. Accordingly, the user may take himself/herself and at the same time directly identify his or her 3D image through the preview interface.

However, in order to generate the 3D image by using the first camera 3260 and the second camera 3270, the resolution of the first camera 3260 should be the same as that of the second camera 3270. Accordingly, the display device may adjust the second resolution of the second camera 3270, which is high resolution, to the first resolution of the first camera 3260, whereby the first resolution of the first camera 3260 may be the same as the second resolution of the second camera 3270.

In other words, the first resolution of the first camera 3260 is different from the second resolution of the second camera 3270 in view of hardware. However, the display device may adjust the first resolution of the first camera 3260 and the second resolution of the second camera 3270 to be the same as each other in view of software through a method such as image processing.

For example, the display device may adjust image of high resolution to image of low resolution, whereby resolution of the first image corresponding to the left eye of the user may become the same as that of the second image corresponding to the right eye of the user.

Figure 37:
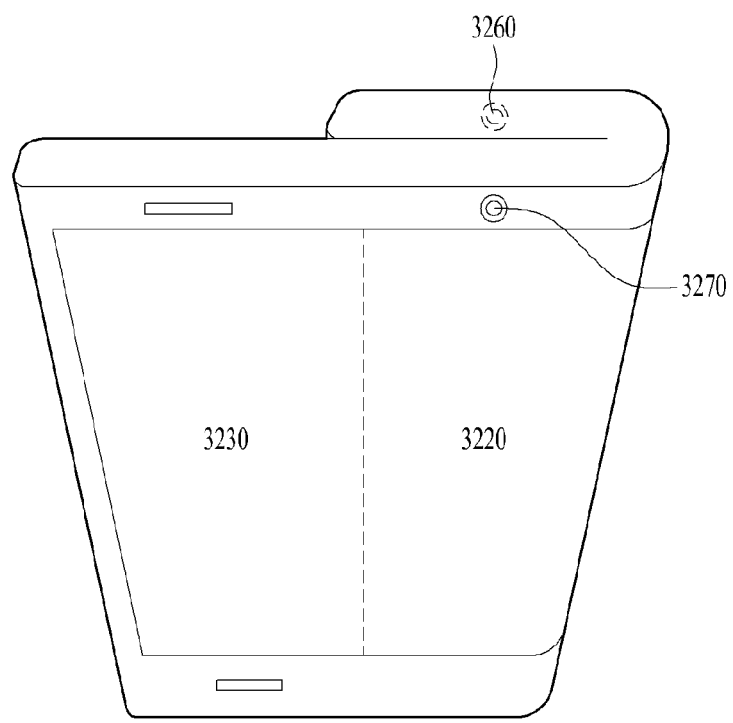
FIG. 37 is a diagram illustrating an example of a display device of which first bending portion is bent.

FIG. 37 is a diagram illustrating an example of a display device of which first bending portion is bent. To assist understanding, the display device of FIG. 37 will be described with reference to the display device of FIG. 35.

As described above, the first camera 3260 and the second camera 3270 may be provided on the front side where the flexible display screen of the display device is provided. Accordingly, if the first bending portion 3280 is bent, the first camera 3260 and the second camera 3270 may be located towards directions different from each other.

Accordingly, as shown in FIG. 37, the first camera 3260 may be used as a rear camera, and the second camera 3270 may be used as a front camera. Also, the user located at the front may view the first image acquired from the first camera 3260 through the preview interface provided to the second screen 3220 and the third screen 3230.

In this way, if the first bending portion 3280 is bent, the direction of the first camera 3260 may be varied. Also, since the first camera 3260 is likely to be used as the rear camera, it may generally take a scene or subject of a long distance.

Also, the display device may fix the direction of the second camera 3270 even though the first bending portion 3280 or the second bending portion 3290 is bent. Also, since the second camera 3270 is likely to be used as the front camera, it may serve as a self camera in the display device of the self mode.

Accordingly, if the first resolution of the first camera 3260 is high resolution and the second resolution of the second camera 3270 is low resolution, the display device may efficiently use the difference in resolution.

In other words, if the difference in resolution occurs in view of hardware, the display device may locate the first camera 3260 close to the first screen 3210 to have high resolution and the second camera 3270 close to the second screen 3220 to have low resolution on the basis of the first bending portion.

As a result, as shown in FIG. 37, if the user desires to take a scene or other subject, the display device may take the scene or other subject through the first camera 3260 which has high resolution. Also, the display device may provide a preview interface that displays the first image taken by the second screen 3220 and the third screen 3230.

As described above, the display device may display the image of high resolution through the first screen 3210 and the second screen 3220, whereby the user may view the image of high resolution well.

Figure 38:
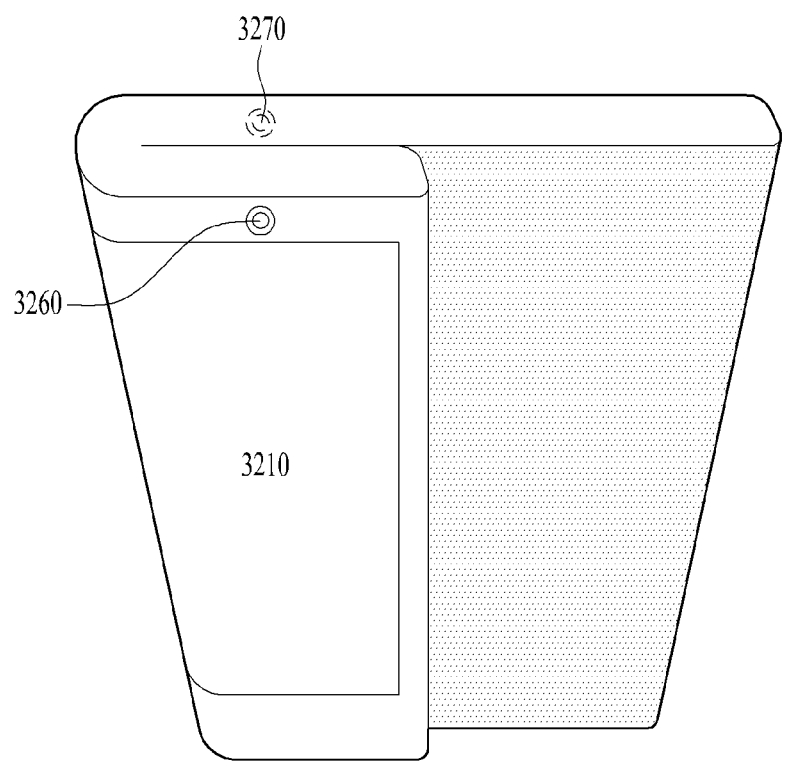
FIG. 38 is a diagram illustrating another example of a display device of which first bending portion is bent.

FIG. 38 is a diagram illustrating another example of a display device of which first bending portion is bent. To assist understanding, the display device of FIG. 38 will be described with reference to the display device of FIG. 35. Also, as described with reference to FIG. 37, it is assumed that the first camera 3260 has high resolution and the second camera 3270 has low resolution.

If the first bending portion 3280 is bent, the first camera 3260 and the second camera 3270 may be located towards directions different from each other. Accordingly, as shown in FIG. 38, the display device may use the first camera 3260 as a front camera and the second camera 3270 as a rear camera. Also, the user located at the front may view the preview interface, which displays a taken image, through the first screen 3210.

As shown in FIG. 37 and FIG. 38, even though the first bending portion 3280 is bent equally, the first camera 3260 may be used as the front camera or the rear camera in accordance with the location of the user who uses the display device. In other words, the second camera may be used as the front camera or the rear camera in accordance with a grip shape of the user who grips the display device of which first bending portion is bent.

Accordingly, if the user takes an image of a short distance, or if an image of high resolution is not needed, the display device may take an image through the second camera 3270 of low resolution. Also, the display device may provide a preview interface for displaying the second image acquired from the second camera 3270, to the first screen 3210 or the third screen 3230.

If the image of low resolution is displayed using the great screen, its picture quality may be viewed to be more deteriorated. Accordingly, the display device may display the image of low resolution to be smaller by using the first screen 3210 or the third screen 3230 only, whereby picture quality of the image of low resolution may not be deteriorated.

As described with reference to FIG. 37 and FIG. 38, the display device may display the image of high resolution to be greater and display the image of low resolution to be smaller. In other words, the display device may use the screen to be suitable for the resolution of the image which is displayed.

Accordingly, the user may view the first image of high resolution by using the second screen 3220 and the third screen 3230, and view the second image of low resolution by using the first screen 3210 or the third screen 3230. In other words, the user may feel high picture quality better and feel low picture quality less.

In the meantime, in the display device according to one embodiment, the first camera 3260 and the second camera 3270 are provided at the same side, and the first bending portion 3280 and the second bending portion 3290, whereby each of the first camera 3260 and the second camera 3270 may be used in various manners as the front camera or the rear camera.

In this case, the camera located at the front of the user who uses the display device may be defined as the front camera, and the camera that takes a direction opposite to that of the front camera may be defined as the rear camera. Accordingly, the front camera may be used for self photographing like that the user who uses the display device takes himself or herself, whereas the rear camera may be used for photographing like that the user takes other user, other subject, scene, etc.

Also, the display device may provide the preview interface, which displays an image of an object taken by the user, to at least one of the first screen 3210, the second screen 3220, and the third screen 3230.

However, the display device according to one embodiment may be bent through the first bending portion 3280 and the second bending portion 3290, and the user may rotate the display device. Accordingly, the display device may control the camera and screen which are activated, as the case may be.

Accordingly, one embodiment that the display device controls the camera and the screen, which are activated, will be described with reference to FIG. 39 to FIG. 45.

Figure 39:
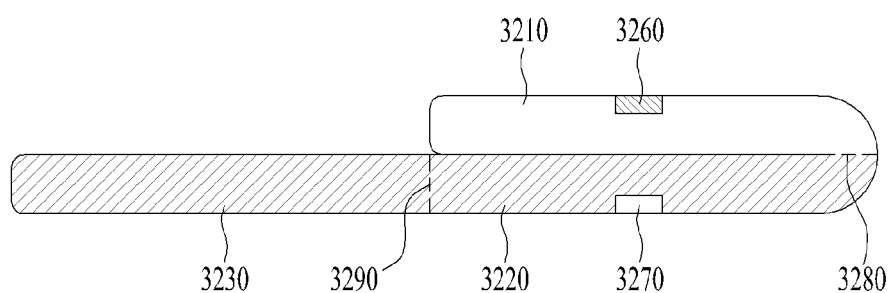
FIG. 39 is a diagram illustrating an example of a display device of which first camera is activated.

FIG. 39 is a diagram illustrating an example of a display device of which first camera is activated, and illustrates a plane of the display device.

As shown in FIG. 39, if the first camera 3260 is activated, the display device may provide the preview interface, which displays the first image acquired from the first camera 3260, to the second screen 3220 and the third screen 3230.

In this way, if the first bending portion 3280 is bent and the first camera 3260 is activated, the display device may provide the preview interface, which displays the first image, to the second screen 3220 and the third screen 3230.

Figure 40:
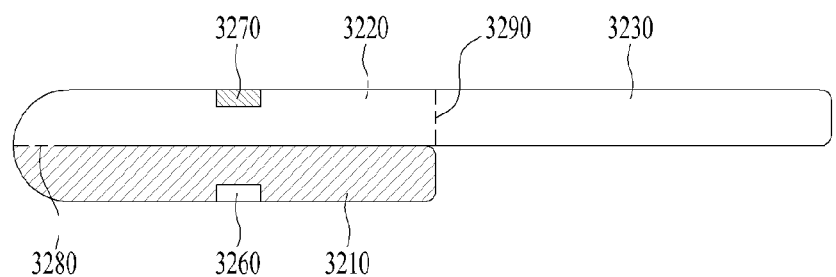
FIG. 40 is a diagram illustrating an example of a display device of which second camera is activated.

FIG. 40 is a diagram illustrating an example of a display device of which second camera is activated.

As shown in FIG. 40, if the second camera 3270 is activated, the display device may provide the preview interface, which displays the second image acquired from the second camera 3270, to the first screen 3210.

In this way, if the first bending portion 3280 is bent and the second camera 3270 is activated, the display device may provide the preview interface, which displays the second image, to the first screen 3210.

However, if the second bending portion 3290 is bent and the second camera 3270 is activated, the display device may provide the preview interface, which displays the second image, to the third screen 3230.

In the meantime, the display device may be operated in the first mode for self photographing or the second mode for normal photographing. At this time, if the display device is in the first mode, the screen, which will provide the preview interface, should be the one which is bent in the same direction as that of the activated camera. This is to allow the user who performs self photographing to view the taken image. Hereinafter, the display device will be described in detail with reference to FIG. 41 and FIG. 42.

Figure 41:
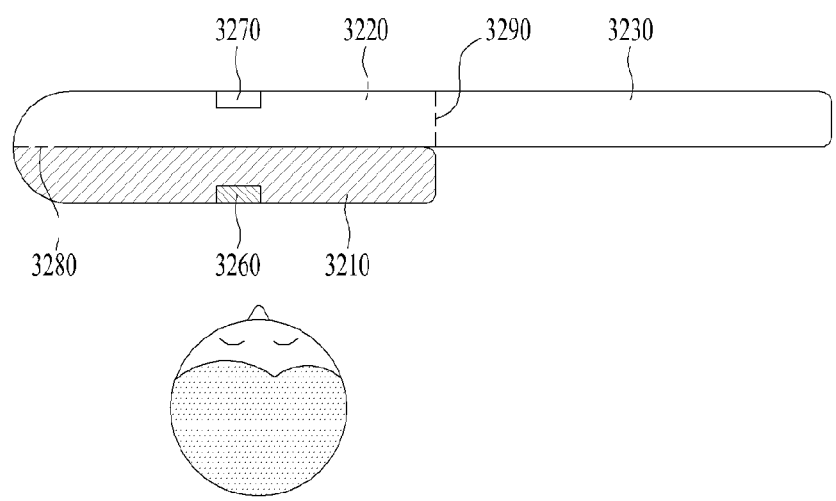
FIG. 41 is a diagram illustrating an example of a display device of which first camera is activated in a first mode for self photographing.

FIG. 41 is a diagram illustrating an example of a display device of which first camera is activated in a first mode for self photographing.

If the display device is in the first mode, the screen, which will provide the preview interface, should be the one which is bent in the same direction as that of the activated camera. Accordingly, the display device according to the embodiment of FIG. 41 may activate the first screen 3210 included in the first body together with the first camera 3260. Also, the display device may deactivate the second screen 3220 and the third screen 3230. In this way, the display device may save the power by deactivating the unnecessary camera and screen.

Accordingly, the display device of the first mode may take the user through the first camera 3260, and may provide the preview interface, which displays the first image, to the first screen 3210. As a result, the user may view his or her image, which is taken through the first camera 3260, through the first screen 3210.

Figure 42:
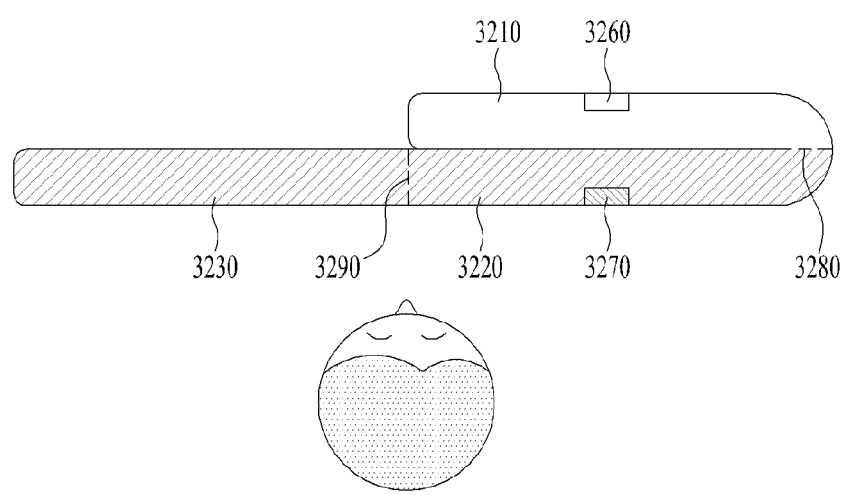
FIG. 42 is a diagram illustrating an example of a display device of which second camera is activated in a first mode for self photographing.

FIG. 42 is a diagram illustrating an example of a display device of which second camera is activated in a first mode for self photographing.

First of all, the display device of the first mode may determine the camera for taking the user for self photographing. Accordingly, the display device may detect the user's face or eyes through the first camera 3260 and the second camera 3270 and activate the cameras which have detected the user's face or eyes. Also, the display device may deactivate the camera which has not detected the user's face or eyes.

Also, the display device may detect a signal for selecting the first mode or the second mode and enter the first mode or the second mode in accordance with the signal. The display device that has entered the first mode may detect the user by using the first image acquired from the first camera 3260 and the second image acquired from the second camera 3270. The display device may activate the camera, which has detected the user, of the first camera 3260 and the second camera 3270.

In the embodiment of FIG. 42, as the user is located at the front of the second camera 3270, the second camera 3270, which has detected the user, is activated, whereas the first camera 3260 is deactivated. Accordingly, the display device, which has activated the second camera 3270, may determine the screen which will provide the preview interface to the user.

If the display device is in the first mode, the screen, which will provide the preview image, should be the one which is bent in the same direction as that of the activated camera. Accordingly, the display device may activate the second screen 3220 included in the second body together with the second camera 3270. Also, since the second bending portion 3290 is not bent, the display device may also activate the third screen 3230. Also, the display device may deactivate the first screen 3210.

Accordingly, the display device of the first mode may take the user through the second camera 3270, and may provide the preview interface, which displays the second image acquired from the second camera 3270, to the second screen 3220 and the third screen 3240. As a result, the user may view his or her image, which is taken through the second camera 3270, through the second screen 3220 and the third screen 3230.

As described above, the camera and the screen, which are activated, may be controlled in accordance with the location of the user's face or eyes detected by the display device of the first mode. In other words, when the display device is in the first mode, the camera and the screen, which are activated, may be varied depending on the location of the user who takes an image, without being fixed.

Accordingly, the user has only to use the display device of the first mode by bending the first bending portion 3280 or the second bending portion 3290. For example, the user who desires to view his or her image, which is being taken, on a great screen, may take the image in the form of the display device based on FIG. 42, whereas the user who desires to view his or her image, which is being taken, on a small screen, may take the image in the form of the display device based on FIG. 41.

Also, the user who desires to his or her image at low resolution may take the image in the form of the display device based on FIG. 42, whereas the user who desires to his or her image at high resolution may take the image in the form of the display device based on FIG. 41.

In other words, since the user is not required to use the display device for self photographing in a fixed form, the display device according to one embodiment may improve convenience of the user.

Figure 43:
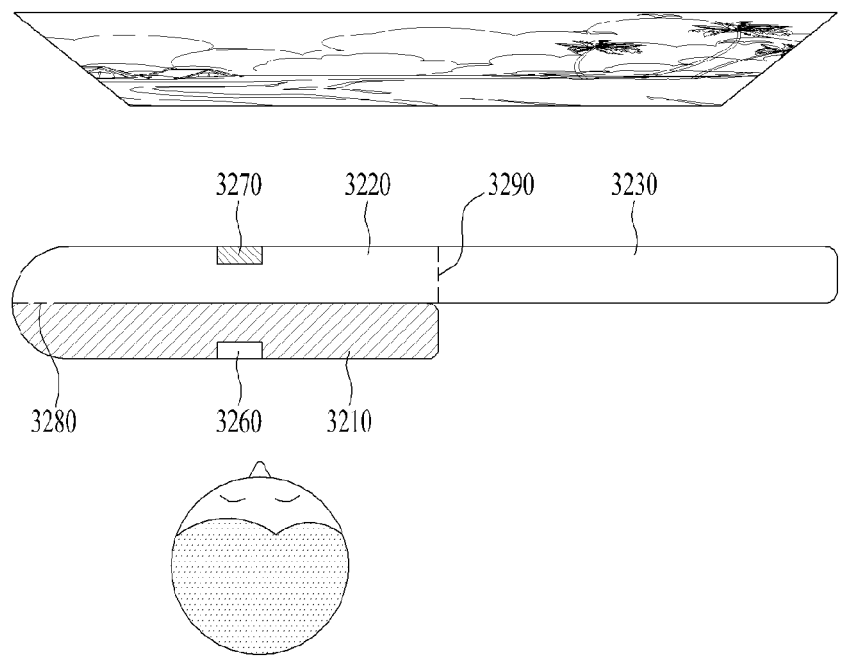
FIG. 43 is a diagram illustrating an example of a display device of which second camera is activated in a second mode for normal photographing.

FIG. 43 is a diagram illustrating an example of a display device of which second camera is activated in a second mode for normal photographing.

First of all, the display device of the second mode for normal photographing may determine the camera for taking the user. Accordingly, the display device may detect the user's face or eyes through the first camera 3260 and the second camera 3270.

If the user takes a background, etc., only one of the first camera 3260 and the second camera 3270 may detect the user. In this case, the display device may deactivate the first camera 3260, which has detected the user, and may activate the second camera 3270 which has not detected the user. In FIG. 43, the user is located at the front of the first camera 3260, and the first camera 3260 is deactivated, whereas the second camera 3270 is activated.

If the user takes another user, both the first camera 3260 and the second camera 3270 may detect the user's face or eyes. In this case, the display device may deactivate the first camera 3260 which has detected the user located to be close thereto, and may activate the second camera 3270 which has detected the user located to be far away therefrom. This is because that the user who takes the image is generally located to be close to the display device.

Also, the display device that has determined the camera which will be activated may determine the screen which will provide the preview interface to the user. In case of the second mode, the screen which will provide the preview interface should be the one bent in a direction different from that of the activated camera. In other words, the screen which will provide the preview interface is the one bent in the same direction as that of the deactivated camera. This is because that the user who takes the image should view the image which is displayed on the preview interface.

Accordingly, the display device according to one embodiment of FIG. 43 may activate the first screen 3210 included in the first body together with the first camera 3260 which is deactivated. Also, the display device may deactivate the second screen 3220 and the third screen 3230. In this way, the display device may save the power by deactivating the unnecessary camera and screen.

Accordingly, the display device of the second mode may take the background through the second camera 3270 and provide the preview interface, which displays the acquired second image, through the first screen 3210.

Figure 44:
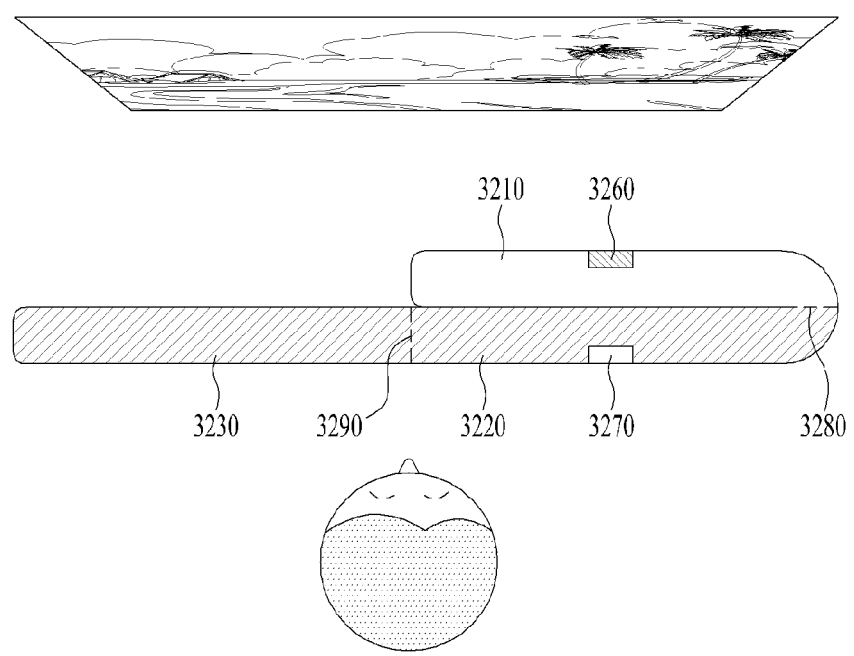
FIG. 44 is a diagram illustrating an example of a display device of which first camera is activated in a second mode for normal photographing.

FIG. 44 is a diagram illustrating an example of a display device of which first camera is activated in a second mode for normal photographing.

As described above, the display device of the second mode may determine the camera for normal photographing. The display device may detect the user's face or eyes through the first camera 3260 and the second camera 3270 and determine the cameras which will be activated and deactivated.

For example, if both the first camera 3260 and the second camera 3270 detect the user's face or eyes, the display device may deactivate the second camera 3270 which has detected the user located to be close thereto, and may activate the first camera 3260 which has detected the user located to be far away therefrom. This is because that the user who takes the image is generally located to be close to the display device.

For another example, if only one of the first camera 3260 and the second camera 3270 detect the user, the display device may deactivate the second camera 3270, which has detected the user, and may activate the first camera 3260 which has not detected the user.

Accordingly, the display device of the second mode according to one embodiment of FIG. 44 may take the background through the first camera 3260 and provide the preview interface, which displays the first image, through the second screen 3220 and the third screen 3230.

Also, if the first bending portion 3280 is bent and the first camera 3260 is activated, the display device may display the first image on the second screen 3220. At this time, the display device may provide a control interface for controlling the first camera 3260 or the first image acquired from the first camera 3260, to the third screen 3230.

As described above, the preview interface may display the first image acquired from the first camera or the second image acquired from the second camera, and may include the control interface for controlling at least one of the first image, the second image, the first camera and the second camera. Also, the preview interface may be provided to at least one of the first screen, the second screen and the third screen in accordance with bending of the first bending portion and the second bending portion and the location of the user.

In the meantime, the display device may detect the signal for selecting the first camera 3260 or the second camera 3270 by means of the user. The display device may activate the first camera 3260 or the second camera 3270 in accordance with the detected signal. In other words, the display device may determine the camera, which will be activated, in various manners such as user detecting, selected signal detecting, etc.

In the meantime, if the display device of the first mode or the second mode, which is bent, detects variation of at least one of the first bending portion and the second bending portion, it may enter the 3D mode for taking 3D image. It is assumed that the display device of the first mode or the second mode is 2D mode for normal 2D image photographing. Accordingly, if the display device of which first bending portion or second bending portion is bent is unfolded to be opened, it may enter the 3D mode for 3D image photographing. This will be described in detail with reference to FIG. 45.

Figure 45:
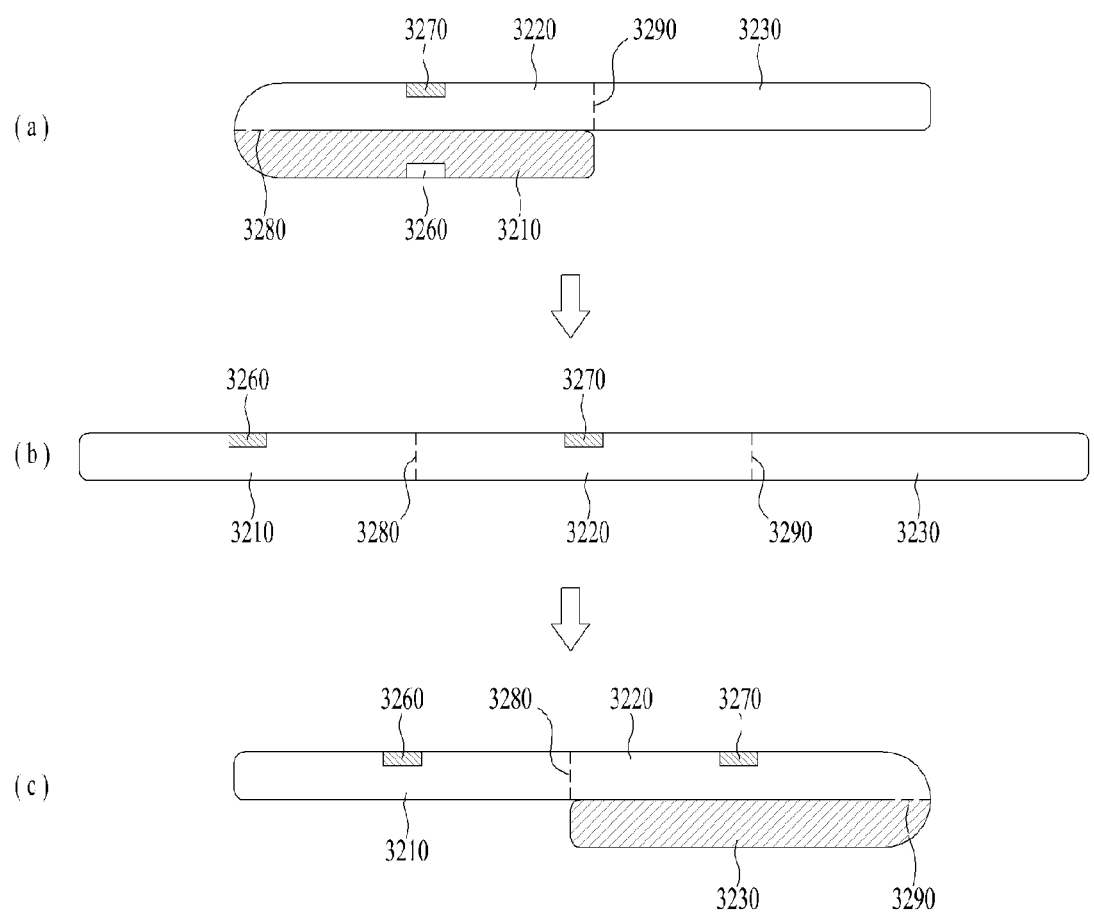
FIG. 45 is a diagram illustrating an example that a display device of a 2D mode enters a 3D mode.

FIG. 45 is a diagram illustrating an example that a display device of a 2D mode enters a 3D mode.

(a) of FIG. 45 is one embodiment of the display device of the 2D mode, wherein the second camera 3270 is activated, the first screen 3210 is activated, and the first camera 3260, the second screen 3220 and the third screen 3230 are deactivated. Through the location of the camera and the screen, which are activated, it is noted that the display device is in the second mode for normal photographing. It is assumed that the first mode and the second mode correspond to 2D modes for 2D image photographing.

At this time, as shown in (b) of FIG. 45, if the device detects the signal indicating that the first bending portion 3280 is unfolded, it may enter the 3D mode. The 3D mode is the mode for 3D image photographing as described with reference to FIG. 35. Accordingly, the display device may activate both the first camera 3260 and the second camera 3270, and may deactivate the first screen 3210, the second screen 3220 and the third screen 3230.

However, if the display device recognizes the user's face or eyes through the first camera 3260 or the second camera 3270, it may provide the preview interface for displaying the 3D image by activating at least one of the first screen 3210, the second screen 3220 and the third screen 3230.

However, as shown in (c) of FIG. 45, if the user bends the second bending portion 3290 to view the preview interface, the display device may provide the preview interface by activating the third screen 3230.

When the display device detects the signal for bending the second bending portion 3290, if the first screen 3210, the second screen 3220 and the third screen 3230 are already activated, the display device may deactivate the first screen 3210 and the second screen 3220 and activate the third screen 3230.

In the meantime, if the first bending portion 3280 is bent and the second camera 3270 is activated, the display device may provide the preview interface in a vertical direction. This will be described in detail with reference to FIG. 46.

Figure 46:
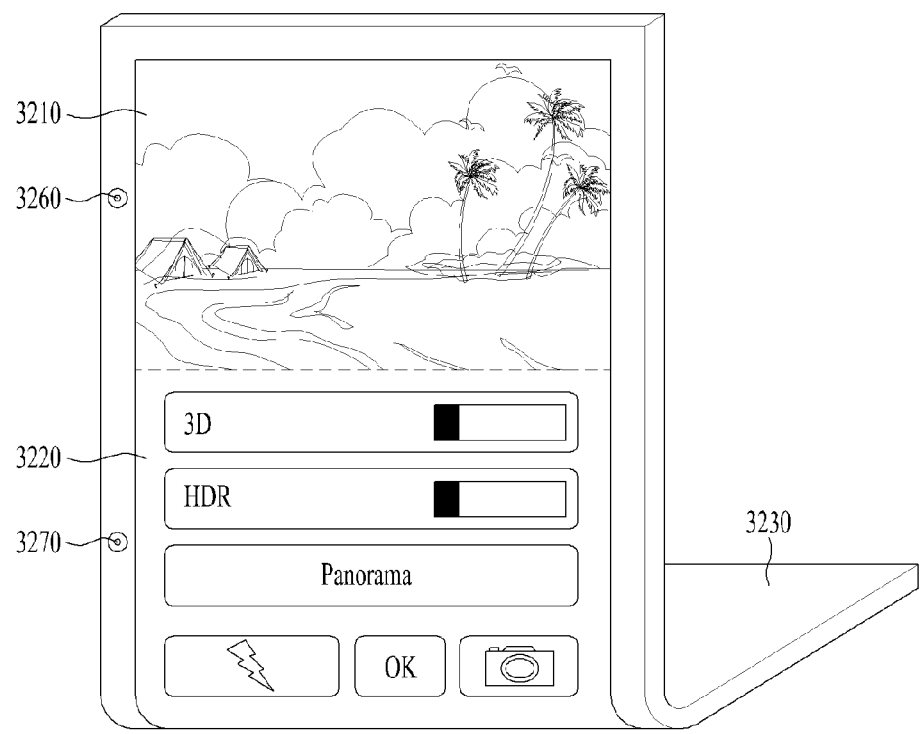
FIG. 46 is a diagram illustrating an example of a display device that provides a preview interface in a vertical direction.

According to the aforementioned description, if the second camera 3270 is activated and the second bending portion 3290 is bent, the display device may provide the preview interface for displaying the second image, to the third screen 3230. However, as shown in FIG. 46, if the bending angle of the second bending portion is within a previously set angle range, the display device may provide the preview interface in a vertical direction. The previously set angle range may include a case where an angle between the third body and the second body is 90 degree.

Also, the preview interface may include the second image acquired from the second camera, and the control interface for controlling the second image or the second camera. Accordingly, the user may take and control the image at his or her convenience while using the third body as a support of the display device.

Figure 47:
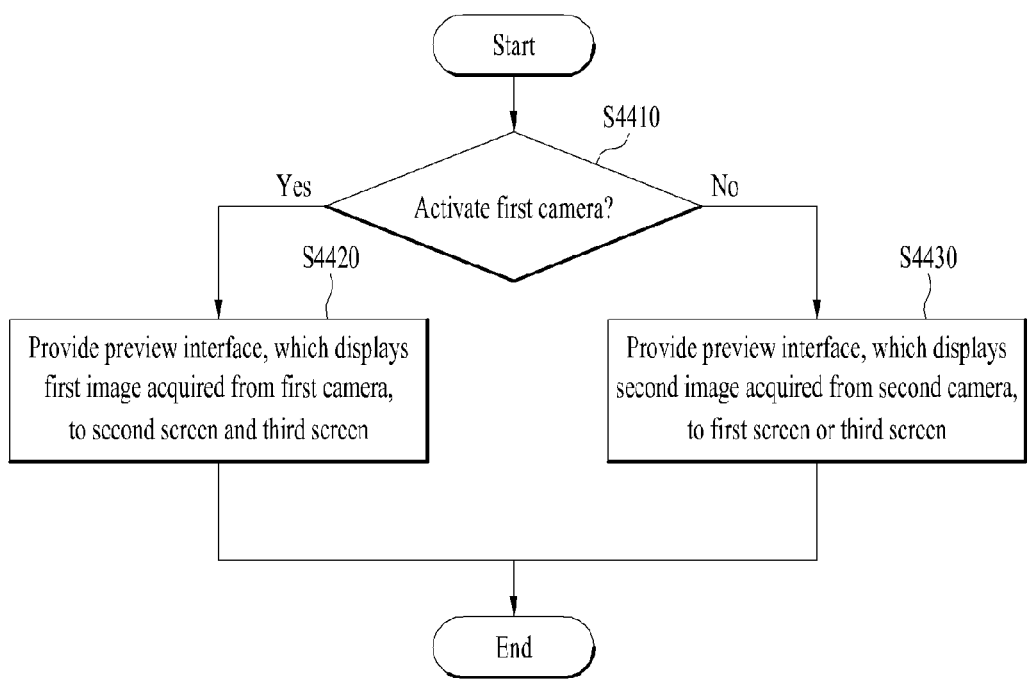
FIG. 47 is a flow chart illustrating a method for controlling a display device according to one embodiment.

FIG. 47 is a flow chart illustrating a method for controlling a display device according to one embodiment.

The display device according to one embodiment may include the first body configured to include the first screen, the second body configured to include the second screen, and the third body configured to include the third screen. Also, the display device may include the first bending portion configured to connect the first body with the second body, and the second bending portion configured to connect the second body with the third body.

Also, the display device may include the first camera of the first resolution in the first body and the second camera of the second resolution in the second body. At this time, the first resolution is higher than the second resolution, and the first and second cameras may be provided on the front side of the display device. Also, the first screen, the second screen and the third screen may be provided on the front side of the display device.

The display device may detect whether the first camera has been activated (S4410). The display device may activate the first camera or the second camera by detecting the signal for selecting the camera desired to be activated by the user. Alternatively, the display device may activate the first camera or the second camera in accordance with the location of the user by detecting the location of the user.

If the first camera is activated, the display device may provide the preview interface, which displays the first image acquired from the first camera, to the second screen and the third screen (S4420). At this time, the first bending portion may be bent.

If the first camera is deactivated and the second camera is activated, the display device may provide the preview interface, which displays the second image acquired from the second camera, to the first screen or the third screen (S4430). At this time, if the first bending portion is bent, the display device may provide the preview interface to the first screen. Also, if the second bending portion is bent, the display device may provide the preview interface to the third screen.

As described with reference to FIG. 42 to FIG. 44, the display device may detect the user by using the first image or the second image. If the display detects the user through the first image, the display device may provide the preview interface to the first screen. Also, if the display device detects the user through the second image, it may provide the preview interface to the second screen and the third screen or provide the preview interface to the first screen and the second screen.

As described above, the display device may be operated in the first mode for self photographing or the second mode for normal photographing. Accordingly, the preview interface provided to the first screen may display the first image in case of the first mode and may the second image in case of the second mode.

Also, the preview interface provided to the second screen and the third screen may display the second image in case of the first mode and may the first image in case of the second mode. At this time, the first bending portion may be bent.

Although the description may be made for each of the drawings for convenience of description, the embodiments of the respective drawings may be incorporated to achieve a new embodiment. Also, a computer readable recording medium where a program for implementing the embodiments is recorded may be designed in accordance with the need of the person skilled in the art within the scope of the present specification.

Also, the display device and the method for controlling the same are not limited to the aforementioned embodiments, and all or some of the aforementioned embodiments may selectively be configured in combination so that various modifications may be made in the aforementioned embodiments.

In the meantime, the method for controlling the display device may be implemented in a recording medium, which can be read by a processor provided in a network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

Also, in this specification, both the product invention and the method invention have been described, and description of both inventions may be made complementally if necessary.

What is claimed is:

1. A display device comprising:
a first body configured to include a first screen;
a second body configured to include a second screen;
a third body configured to include a third screen, wherein the first screen, the second screen and the third screen are provided on a front side of the display device;
a first bending portion configured to connect the first body with the second body;
a second bending portion configured to connect the second body with the third body;
a first camera of first resolution, which is provided in the first body;
a second camera of second resolution, which is provided in the second body, wherein the first resolution of the first camera is higher than the second resolution of the second camera and the first camera and the second camera are provided on the front side of the display device; and
a processor configured to control the first camera, the second camera, the first screen, the second screen and the third screen,
wherein the processor is further configured to:
provide a preview interface to the second screen and the third screen if the first camera is activated, wherein the preview interface displays a first image acquired from the first camera, and
provide the preview interface to the first screen or the third screen if the second camera is activated, wherein the preview interface displays a second image acquired from the second camera.

2. The display device according to claim 1, wherein the first bending portion is bent if the processor provides the preview interface, which displays the first image, to the second screen and the third screen.

3. The display device according to claim 1, wherein the first bending portion is bent if the processor provides the preview interface, which displays the second image, to the first screen.

4. The display device according to claim 1, wherein the second bending portion is bent if the processor provides the preview interface, which displays the second image, to the third screen.

5. The display device according to claim 1, wherein the processor detects a user by using the first image acquired from the first camera and the second image acquired from the second camera, provides the preview interface to the first screen if the user is detected through the first image, and provides the preview interface to the second screen and the third screen or provides the preview interface to the first screen and the second screen if the user is detected through the second image.

6. The display device according to claim 5, wherein the preview interface provided to the first screen displays the first image or the second image.

7. The display device according to claim 5, wherein the preview interface provided to the second screen and the third screen displays the first image or the second image, and the first bending portion is bent.

8. The display device according to claim 5, wherein the preview interface provided to the first screen and the second screen displays the first image or the second image, and the second bending portion is bent.

9. The display device according to claim 1, wherein the display device is in a first mode for self photographing or a second mode for normal photographing.

10. The display device according to claim 9, wherein the processor detects a user by using the first image acquired from the first camera and the second image acquired from the second camera, and activates the first camera or the second camera depending on the detected user, if the display device is in the first mode.

11. The display device according to claim 9, wherein the processor detects a signal for selecting the first mode or the second mode, and enters into the first mode or the second mode according to the signal.

12. The display device according to claim 1, wherein the processor detects a signal for selecting the first camera or the second camera, and activates the first camera or the second camera according to the signal.

13. The display device according to claim 1, wherein the preview interface displays the first image acquired from the first camera or the second image acquired from the second camera, and includes a control interface for controlling at least one of the first camera, the second camera, the first image and the second image.

14. The display device according to claim 1, wherein, if the first bending portion is bent and the first camera is activated, the processor displays the first image on the second screen and provides a control interface for controlling the first camera or the first image to the third screen.

15. The display device according to claim 1, wherein, if the first bending portion is bent and the second camera is activated, the processor provides the preview interface in a vertical direction.

16. The display device according to claim 1, wherein, if the second bending portion is bent, the processor generates a 3D image by using the first image and the second image.

17. The display device according to claim 16, wherein, if a user is detected through the first camera or the second camera, the processor provides the preview interface, which displays the 3D image, to the first screen and the second screen.

18. The display device according to claim 16, wherein the processor controls the first resolution of the first camera to be lowered, so that the first resolution of the first camera is the same as the second resolution of the second camera.

19. A method for controlling a display device, which includes a first body configured to include a first screen, a second body configured to include a second screen, a third body configured to include a third screen, a first bending portion configured to connect the first body with the second body, and a second bending portion configured to connect the second body with the third body, the method comprising the steps of:
providing a preview interface to the second screen and the third screen if a first camera of first resolution, which is provided in the first body, is activated, wherein the preview interface displays a first image acquired from the first camera; and
providing the preview interface to the first screen or the third screen if a second camera of second resolution, which is provided in the second body, is activated, wherein the preview interface displays a second image acquired from the second camera,
wherein the first resolution of the first camera is higher than the second resolution of the second camera, and the first camera and the second camera are provided on a front side of the display device.

20. A display device comprising:
a first body configured to include a first screen;
a second body configured to include a second screen;
a third body configured to include a third screen, wherein the first screen, the second screen and the third screen are provided on a front side of the display device;
a first bending portion configured to connect the first body with the second body;
a second bending portion configured to connect the second body with the third body;
a first camera of first resolution, which is provided in the first body;
a second camera of second resolution, which is provided in the second body, wherein the first resolution of the first camera is higher than the second resolution of the second camera and the first camera and the second camera are provided on the front side of the display device; and
a processor configured to control the first camera, the second camera, the first screen, the second screen and the third screen,
wherein if the display device is in a 2D mode, the processor activates the first camera, and if the display device is in a 3D mode, the processor activates both the first camera and the second camera and controls the first resolution to be lowered so that the first resolution is the same as the second resolution.

* * * * *